United States Patent
Li et al.

(10) Patent No.: US 11,871,273 B2
(45) Date of Patent: Jan. 9, 2024

(54) SYSTEMS AND METHODS FOR USER PLANE HANDLING

(71) Applicants: Xu Li, Nepean (CA); Hang Zhang, Nepean (CA); Bidi Ying, Ottawa (CA)

(72) Inventors: Xu Li, Nepean (CA); Hang Zhang, Nepean (CA); Bidi Ying, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 349 days.

(21) Appl. No.: 17/090,678

(22) Filed: Nov. 5, 2020

(65) Prior Publication Data

US 2021/0144590 A1    May 13, 2021

Related U.S. Application Data

(60) Provisional application No. 62/932,337, filed on Nov. 7, 2019.

(51) Int. Cl.
*H04W 28/08* (2023.01)
*H04W 28/12* (2009.01)
(Continued)

(52) U.S. Cl.
CPC ....... *H04W 28/0975* (2020.05); *H04W 28/12* (2013.01); *H04W 76/11* (2018.02); *H04W 76/12* (2018.02); *H04W 76/36* (2018.02)

(58) Field of Classification Search
CPC . H04W 28/0975; H04W 28/12; H04W 76/11; H04W 76/12; H04W 76/36; H04W 76/22; H04W 76/34
See application file for complete search history.

(56) References Cited

U.S. PATENT DOCUMENTS

2017/0126618 A1    5/2017 Bhaskaran et al.
2018/0014223 A1*   1/2018 Cheng .................. H04L 45/74
(Continued)

FOREIGN PATENT DOCUMENTS

CN      109842639 A     6/2019
WO      2015139773 A1   9/2015
(Continued)

OTHER PUBLICATIONS

Huawei, HiSilicon, implementation of 5GLAN related interface, 3GPP TSG-SA WG2 Meeting #132, Xi'an, China, Apr. 8-12, 2019, S2-1903445, 8 pages.
(Continued)

*Primary Examiner* — Kibrom T Hailu

(57) ABSTRACT

The present invention provides systems and methods and apparatuses for user plane handling. An aspect of the disclosure provides a method of user plane handling. Such a method includes sending, by a first user plane entity, to a second user plane entity, a trigger message for changing the user plane handling for a protocol data unit (PDU) session. Another aspect of the disclosure provides a method of using a shared tunnel. Such a method includes receiving from a reception tunnel by a first user plane entity a tunnel packet including a tunnel header and a data packet. Such a method further includes routing, by the first user plane entity to a second tunnel using information in the tunnel header without processing the data packet.

18 Claims, 23 Drawing Sheets

(51) Int. Cl.
      *H04W 76/12*     (2018.01)
      *H04W 76/11*     (2018.01)
      *H04W 76/36*     (2018.01)

(56) References Cited

U.S. PATENT DOCUMENTS

| | | | |
|---|---|---|---|
| 2018/0097657 A1* | 4/2018 | Dao | ............ H04L 41/0893 |
| 2019/0098537 A1 | 3/2019 | Qiao et al. | |
| 2019/0116631 A1 | 4/2019 | Talebi Fard et al. | |

FOREIGN PATENT DOCUMENTS

| | | |
|---|---|---|
| WO | 2018026169 A1 | 2/2018 |
| WO | 2018232759 A1 | 12/2018 |

OTHER PUBLICATIONS

3GPP TS 23.501 V16.2.0 (Sep. 2019), 3rd Generation Partnership Project; Technical Specification Group Services and System Aspects; System Architecture for the 5G System (5GS); Stage 2, (Release 16), 391 pages.

3GPP TS 23.502 V16.2.0 (Sep. 2019), 3rd Generation Partnership Project; Technical Specification Group Services and System Aspects; Procedures for the 5G System (5GS); Stage 2, (Release 16), 525 pages.

Ericsson, "Control of traffic forwarding in 5G-LAN," SA WG2 Meeting #130, Jan. 21-25, 2019, Kochi, India. S2-1901467, 6 pages.

3GPP TR 23.724 V16.1.0 (Jun. 2019), "3rd Generation Partnership Project; Technical Specification Group Services and System Aspects; Study on Cellular Internet of Things (CIoT) support and evolution for the 5G System (5GS) (Release 16)," pp. 1-274.

* cited by examiner

| Attribute | | Description | Comment |
|---|---|---|---|
| N4 Session ID | | Identifies the N4 session associated to this PDR. NOTE 5. | |
| Rule ID | | Unique identifier to identify this rule. | |
| Precedence | | Determines the order, in which the detection information of all rules is applied. | |
| Packet Detection Information. NOTE 4. | Source interface | Contains the values "access side", "core side", "SMF", "N6-LAN", "5G VN internal". | Combination of UE IP address (together with Network instance, if necessary), CN tunnel info, packet filter set, application ID, Ethernet PDU Session Information and QFI are used for traffic detection. Source interface identifies the interface for incoming packets where the PDR applies, e.g. from access side (i.e. up-link), from core side (i.e. down-link), from SMF, from N6-LAN (i.e. the DN or the local DN), or from "5G VN internal" (i.e. local switch). Details like all the combination possibilities on N3, N9 interfaces are left for stage 3 decision. |
| | UE IP address or UE group IP address | One IPv4 address and/or one IPv6 prefix with prefix length (NOTE 3). | |
| | Network instance (NOTE 1) | Identifies the Network instance associated with the incoming packet. | |
| | CN tunnel info | CN tunnel info on N3, N9 interfaces, i.e. F-TEID. | |
| | Packet Filter Set | | |
| | Application ID | | |
| | QoS Flow ID | Contains the value of 5QI or non-standardized QFI. | |
| | Ethernet PDU Session Information | Refers to all the (DL) Ethernet packets matching an Ethernet PDU session. | |
| | Framed Route Information | Refers to Framed Routes. | |
| | Traffic differentiation information (TDI) | e.g. UE ID/address, UE group ID/address, Path ID or PDU Session ID. | |

FIG. 20A

| Attribute | | Description | Comment |
|---|---|---|---|
| Packet replication and detection carry on information | Packet replication information NOTE 7 | Contains UE address or N19/N6 indication. If the packet matches the packet replication information, i.e., source address of the packet is the UE address or the packet has been received on the interface in the packet replication information, the UP function neither creates a copy of the packet nor applies the corresponding processing (i.e., FAR, QER, URR). Otherwise the UPF performs a copy and applies the corresponding processing (i.e., FAR, QER, URR). | |
| | Carry on indication | Instructs the UP function to continue the packet detection process, i.e., lookup of the other PDRs without higher precedence. | |
| NOTE 6 | | | |
| Outer header removal | | Instructs the UP function to remove one or more outer header(s) (e.g. IP+UDP+GTP, IP + possibly UDP, VLAN tag), from the incoming packet. | Any extension header shall be stored for this packet. |
| Forwarding Action Rule ID (NOTE 2) | | The Forwarding Action Rule ID identifies a forwarding action that has to be applied. | |
| Multi-Access Rule ID (NOTE 2) | | The Multi-Access Rule ID identifies an action to be applied for handling forwarding for a MA PDU Session. | |
| List of Usage Reporting Rule ID(s) | | Every Usage Reporting Rule ID identifies a measurement action that has to be applied. | |
| List of QoS Enforcement Rule ID(s) | | Every QoS Enforcement Rule ID identifies a QoS enforcement action that has to be applied. | |

FIG. 20B

NOTE 1: Needed e.g. in case:
- UPF supports multiple DNN with overlapping IP addresses;
- UPF is connected to other UPF or AN node in different IP domains.
- UPF "local switch", N6-based forwarding and N19 forwarding is used for different 5G LAN groups.

NOTE 2: Either a FAR ID or a MAR ID is included, not both.

NOTE 3: The SMF may provide an indication asking the UPF to allocate one IPv4 address and/or IPv6 prefix. When asking to provide an IPv6 Prefix the SMF provides also an IPv6 prefix length.

NOTE 4: A PDR is sent over N16a from SMF to I-SMF, the Packet Detection Information may indicate that the I-SMF is to locally determine CN tunnel info in order to build the N4 PDR sent to the actual UPF controlled by the I-SMF.

NOTE 5: The rules exchanged between I-SMF and SMF are not associated with a N4 Session ID but are associated with a N16a association.

NOTE 6: Needed in case of support for broadcast traffic forwarding.

NOTE 7: Needed to prevent UPF from sending the broadcast packets back to the source UE or source N19/N6. Usage of packet replication information is only intended for configurations with 1 or 2 UPF serving a VN group.

FIG. 20C

| Attribute | Description | Comment |
|---|---|---|
| N4 Session ID | Identifies the N4 session associated to this FAR. | NOTE 9. |
| Rule ID | Unique identifier to identify this information. | |
| Action | Identifies the action to apply to the packet | Indicates whether the packet is to be forwarded, duplicated, dropped or buffered.<br>When action indicates forwarding or duplicating, a number of additional attributes are included in the FAR.<br>For buffering action, a Buffer Action Rule is also included and the action can also indicate that a notification of the first buffered and/or a notification of first discarded packet is requested. |
| Network instance (NOTE 2) | Identifies the Network instance associated with the outgoing packet (NOTE 1). | NOTE 8. |
| Destination interface (NOTE 3) (NOTE 7) | Contains the values "access side", "core side", "SMF", "N6-LAN", "5G VN internal" or "5G VN N19". | Identifies the interface for outgoing packets towards the access side (i.e. down-link), the core side (i.e. up-link), the SMF, the N6-LAN (i.e. the DN or the local DN), to 5G VN internal (i.e. local switch), or to 5G VN N19 (i.e. N19 interface). |
| Outer header creation (NOTE 3) | Instructs the UP function to add an outer header (e.g. IP+UDP+GTP+QFI, VLAN tag), IP + possibly UDP to the outgoing packet. | Contains the CN tunnel info, N6 tunnel info or AN tunnel info of peer entity (e.g. NG-RAN, another UPF, SMF, local access to a DN represented by a DNAI) (NOTE 8).<br>Any extension header stored for this packet shall be added.<br>Include traffic differentiation indicator (indicating whether to include TDI in the outer header) and associated information, e.g. traffic differentiation information (TDI), if any. |
| Send end marker packet(s) (NOTE 2) | Instructs the UPF to construct end marker packet(s) and send them out. | This parameter should be sent together with the "outer header creation" parameter of the new CN tunnel info. |

FIG. 21A

| Attribute | Description | Comment |
|---|---|---|
| Transport level marking (NOTE 3) | Transport level packet marking in the uplink and downlink, e.g. setting the DiffServ Code Point. | NOTE 8. |
| Forwarding policy (NOTE 3) | Reference to a preconfigured traffic steering policy or http redirection (NOTE 4). | Contains one of the following policies identified by a TSP ID:<br>- an N6-LAN steering policy to steer the subscriber's traffic to the appropriate N6 service functions deployed by the operator, or<br>- a local N6 steering policy to enable traffic steering in the local access to the DN according to the routing information provided by an AF.<br>or a Redirect Destination and values for the forwarding behaviour (always, after measurement report (for termination action "redirect")). |
| Request for Proxying in UPF | Indicates that the UPF shall perform ARP proxying and / or IPv6 Neighbour Solicitation Proxying. | Applies to the Ethernet PDU Session type. |
| Container for header enrichment (NOTE 2) | Contains information to be used by the UPF for header enrichment. | Only relevant for the uplink direction. |
| Buffering Action Rule (NOTE 5) | Reference to a Buffering Action Rule ID defining the buffering instructions to be applied by the UPF (NOTE 6) | |

FIG. 21B

NOTE 1: Needed e.g. in case:
- UPF supports multiple DNN with overlapping IP addresses;
- UPF is connected to other UPF or NG-RAN node in different IP domains;
- UPF "local switch" and N19 forwarding is used for different 5G LAN groups.

NOTE 2: These attributes are required for FAR action set to forwarding.

NOTE 3: These attributes are required for FAR action set to forwarding or duplicating.

NOTE 4: The TSP ID is preconfigured in the SMF, and included in the FAR. The TSP ID action is enforced before the Outer header creation actions.

NOTE 5: This attribute is present for FAR action set to buffering.

NOTE 6: The buffering action rule is created by the SMF and associated with the FAR in order to apply a specific buffering behaviour for DL packets requested to be buffered.

NOTE 7: The use of "5G VN internal" instructs the UPF to send the packet back for another round of ingress processing using the active PDRs pertaining to another N4 session of the same 5G VN group.

NOTE 8: A FAR is sent over N16a from SMF to I-SMF, the FAR sent by the SMF may indicate that the I-SMF is to locally determine the value of this attribute in order to build the N4 FAR rule sent to the actual UPF controlled by the I-SMF.

NOTE 9: The rules exchanged between I-SMF and SMF are not associated with a N4 Session ID but are associated with a N16a association

FIG. 21C

SYSTEMS AND METHODS FOR USER PLANE HANDLING

CROSS-REFERENCE TO RELATED APPLICATIONS

This application claims the benefit of priority to the U.S. Patent Application Ser. No. 62/932,337 and entitled "SYSTEMS AND METHODS FOR USER PLANE HANDLING" filed Nov. 7, 2019, which is hereby incorporated by reference in its entirety.

FIELD OF THE INVENTION

The present invention pertains to the field of network communications, and in particular to methods and systems for user plane handling.

BACKGROUND

So called fifth generation (5G) wireless networks have been proposed by the third generation partnership project (3GPP). In a proposed 5GS (5G System), there are communication services provided for connecting a UE (User Equipment) to a DN (Data Network). For example, a PDU (Protocol Data Unit) Session can be established between the UE and the DN for the UE to send and receive data. In current 3GPP 5GS, when a UE communicates with the DN (e.g. an application server in the DN) or with another UE, the UE may need to have a PDU Session before the communication starts. If the UE does not have a suitable PDU Session to use for the communication, the UE may need to request to establish one. The UE then uses the PDU Session (an existing one or a newly established one) for the communication. When a user plane is used to support the communication, a user plane path is established or configured for the PDU Session.

When a UE moves, the radio access network (RAN) node serving the UE can change. When the serving RAN node changes, a user plane path switch is typically needed for the PDU session. Such a path switch typically requires overhead signalling in the control plane to bring about such a path switch. Such overhead can be significant, especially when a path switch happens frequently due to frequent handover (which may in turn be due to high UE mobility or an unstable wireless channel).

Therefore, there is a need for a method and apparatus for flexible and scalable architecture model that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide systems and methods to enable a communication service that supports efficient communication between user plan entities.

An aspect of the invention provides a method of managing user plane path. Such a method includes receiving, by a first user plane entity (UPE) of a first UP path from a second UPE of a second UP path, a message indicating release of resources associated with a user equipment (UE), the message including one or more of: an identifier (ID) of a PDU session associated with the UE and ID of a third UPE of the second UP path. Such a method further includes sending, by the first UPE to a fourth UPE of the first UP path, a UP message for triggering the fourth UPE to forward traffic directed toward the first UPE to the third UPE, the UP message comprising the ID of the third UPE. A technical effect of this aspect includes allowing the UP entities to directly communicate with each other to implement or perform a path switch or data forwarding while reducing or minimizing the amount of control plane signaling compared to prior art techniques. This can reduce delays and reduce demands on control plane resources.

In some embodiments, the third UPE and the fourth UPE are different, the method further including sending, by the fourth UPE to the third UPE, the traffic using a preconfigured tunnel between the fourth UPE and the third UPE. In some embodiments, the UP message further comprises a data network name (DNN) associated with the third UPE. In some such embodiments, the sending, by the fourth UPE to the third UPE, the traffic using a preconfigured tunnel between the fourth UPE and the third UPE includes: identifying, based on the DNN, the preconfigured tunnel. In some embodiments, the UP message further includes information identifying the traffic. In some embodiments, the UP message is sent as part of a tunneled data packet and the UP message is indicated in a tunnel header of the tunneled data packet; and sending, to a fourth UPE of the first UP path, a UP message includes including a data packet as payload of the tunneled data packet. In some embodiments, the method further includes: receiving, by the first UPE from the fourth UPE, a first response indicating that the fourth UPE will no longer send the traffic to the first UPE; and sending, by the first UPE to the second UPE, a second response indicating the first UPE will no longer send the traffic to the second UPE. In some embodiments, the third UPE is an anchor UPF and the fourth UPE is an intermediate UPF of the first UP path. In such embodiments, the method further includes: sending, by the third UPE to the fourth UPE, a first end marker message indicating that the third UPE will no longer send the traffic to the fourth UPE; and sending, by the fourth UPE to the third UPE, a second end marker message indicating that the fourth UPE will no longer send the traffic to the third UPE. In some embodiments, sending, by the second UPE to the third UPE, using a first preconfigured tunnel between the second UPE and the third UPE, a UP message indicating a trigger of tunnel binding; binding, by the third UPE, a second preconfigured tunnel to a traffic identified in the UP message; and sending, by the third UPE to the second UPE, the traffic using the second preconfigured tunnel. In some embodiments, the first preconfigured tunnel and the second preconfigured tunnel are one of: same and different. In some embodiments, each of the first preconfigured tunnel and the second preconfigured tunnel is one of: unidirectional and bidirectional. In some such embodiments, the third UPE is an anchor UPF, the method further includes activating, by the third UPE, UP handling rules related to the traffic; associating the UP handling rules to the first tunnel; and applying the activated UP handling rules to the traffic. In some embodiments, the third UPE is an intermediate UPF and the fourth UPE is an anchor UPF of the second UP path. In some such embodiments, the method further includes sending, by the third UPE to the fourth UPE, a UP message indicating a trigger of tunnel binding using a preconfigured tunnel; binding, by the fourth UPE, the preconfigured tunnel to a traffic identified in the UP message; and sending, by the fourth UPE to the third UPE, the traffic using the preconfigured tunnel. In some embodiments, the third UPE is an intermediate UPF of the second UP path and the fourth UPE is an intermediate UPF of the first UP path. In some such embodiments, the method further includes sending, by the third UPE to an anchor UPF, a UP message indicating a trigger of tunnel binding using a preconfigured tunnel; binding, by the anchor UPF, the preconfigured tunnel to a traffic identified in the UP message; sending, by the anchor UPF to the fourth UPE, a first end marker message indicating that the anchor UPF will no longer send DL data to the fourth UPE; sending, by the fourth UPE to the third UPE, a second end marker message indicating that the fourth UPE will no longer send DL data to the third UPE; and sending, by the anchor UPF UPE to the third UPE, the traffic using the preconfigured tunnel. In some embodiments, the preconfigured tunnel is a shared user plane (UP) tunnel. In some such embodiments, the method further includes receiving, by the third UPE from the fourth UPE, a data packet using the preconfigured tunnel, the data packet included in a tunneled data packet; selecting, by the third UPE, a user plane connection based on a tunnel header of the tunneled data packet; and routing the data packet according to the user plane connection.

It is noted that in some cases the message described could be received from a connectivity manager, instead of the second UPE. Accordingly, another aspect provides a method of managing user plane path, the method including receiving, by a first user plane entity (UPE) of a first UP path from a connectivity manager, a message indicating release of resources associated with a user equipment (UE), the message including one or more of an identifier (ID) of a PDU session associated with the UE and ID of a third UPE of a second UP path. Such a method further includes sending, by the first UPE to a fourth UPE of the first UP path, a UP message for triggering the fourth UPE to forward traffic directed toward the first UPE to the third UPE, the UP message comprising the ID of the third UPE.

Another aspect of the invention provides a method of routing, by a user plane entity (UPE). Such a method includes receiving a data packet using a shared user plane (UP) tunnel, the data packet included in a tunneled data packet; selecting a user plane connection based traffic differentiation information (TDI) included in the tunnel header, the TDI differentiating the data packet from other traffic using the shared UP tunnel. Such a method further includes routing the data packet according to the user plane connection. A technical effect of this aspect allows tunnel sharing to reduce tunnel configuration signals and thus reduces network management overhead. Further this can also reduce the size of tunnel lookup table at user plane entities, e.g. UPF and RAN nodes.

In some embodiments, the TDI includes one or more of: an identifier (ID) of a PDU session associated with the data packet; destination information indicating a destination of the data packet; and ID of a UP path indicating the UP path over which the data packet is being routed. In some embodiments, the UPE is a radio access network (RAN) node, the user plane connection is one of: a data radio bearer and an N3 connection tunnel. In some embodiments, the UPE is a user plane function (UPF), the user plane connection is one of: an N3 connection, N9 connection and N6 connection. In some embodiments, the routing the data packet according to the user plane connection comprises producing an outbound tunnel packet having a tunnel header and a payload, the tunnel header including a corresponding TDI and the payload including the data packet. In some embodiments, the tunnel header includes an indicator indicating whether traffic differentiation is needed. In some embodiments, the tunneled data packet is a GTP packet. In some embodiments, the method further includes receiving, by the UPE from a network function, packet handling rules for selecting the user plane connection. In some embodiments, the UPE is a radio access network (RAN) node, the packet handling rules comprise one or more of: tunnel endpoint identifiers (TEID), traffic differentiation information (TDI), and quality of service (QoS) flow information. In some embodiments the data packet is a downlink (DL) data packet, and the method further includes allocating one or more data radio bearers (DRB) based on the packet handling rules; and wherein the selecting a user plane connection based on a tunnel header of the tunneled data packet comprises selecting a DRB from the one or more DRB based on the packet handling rules and the tunnel header. In some embodiments, the UPE is a user plane function (UPF), the packet handling rules comprises one or more of: traffic differentiation information (TDI) for detecting traffic and traffic differentiation indicator indicating whether to include the TDI when routing a data packet. In some embodiments, the packet handling rules is sent as part of packet detection rule (PDR) and forwarding action rule (FAR), wherein the PDR comprises the TDI, and the FAR comprises traffic differentiation indicator. In some embodiments, the packet handling rules comprises traffic detection information including one or more of a packet filter and packet flow description. In some embodiments, the selecting a user plane connection based on a tunnel header of the tunneled data packet comprises: selecting the user plane connection based on the traffic detection information and packet handling rules.

BRIEF DESCRIPTION OF THE FIGURES

Further features and advantages of the present invention will become apparent from the following detailed description, taken in combination with the appended drawings, in which:

FIGS. 20A-C illustrate an example structure of a packet detection rule according to an embodiment of the present invention.

FIGS. 21A-C illustrate an example structure of FAR, according to an embodiment of the present invention.

It will be noted that throughout the appended drawings, like features may be identified by like reference numerals.

DETAILED DESCRIPTION

Figure 1:
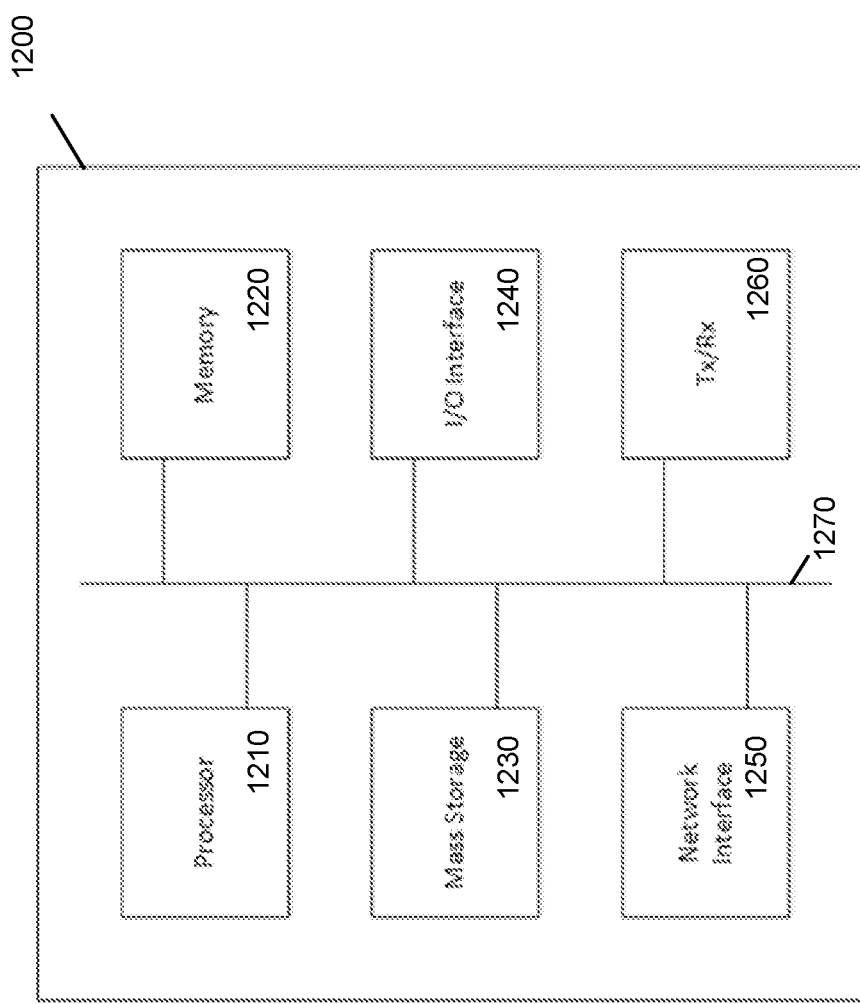
FIG. 1 is a schematic diagram of an electronic device, in accordance with embodiments of the present invention.

The term "network function (NF)" refers to any physical or virtual network functions (PNFs, VNFs) that can perform UP (user plane), CP (control plane), and/or MP (management plane) functionalities. Typically, a network function is instantiated within network elements or nodes which include a processor and memory for implementing the network function.

Unless defined otherwise, all technical and scientific terms used herein have the same meaning as commonly understood by one of ordinary skill in the art to which this invention belongs.

In a wireless system, e.g. 3GPP 5GS, the wireless network includes a RAN, and a 5G core network (5GC) for connecting UE's with DNs. In such a network, a path switch happens for a UE (in fact, for each active PDU Session of the UE) when the UE is handed over from a source RAN node to a target RAN node. During the path switch, the user plane connection between the RAN and the core network, e.g. 5GC, is updated or modified to be a connection (referred to as new connection) between the target RAN node and the core network from a connection (referred to as old connection) between the source RAN node and the core network. In the core network, the end point of the old connection is a user plane function (UPF) referred to as source UPF. The end point of the new connection is a UPF referred to as target UPF. The source UPF and the target UPF may be the same entity or may be two different entities. The old connection and the new connection are both implemented as or supported by a tunnel, e.g. GPRS (Generic Packet Radio Service) tunneling protocol (GTP) tunnel such as GTP-U tunnel. It is noted that in this specification, the terms 'connection' and 'tunnel' (i.e. tunnel corresponding to the connection) are used interchangeably, unless otherwise indicated.

Currently, the path switch is performed or coordinated by a control plane function (CPF), e.g. the session management function (SMF), that serves the PDU Session. That is, the SMF instructs or configures the target RAN node and the target UPF to establish the new connection (including the corresponding tunnel). The SMF also instructs the source RAN node and the source UPF to release the old connection (including the corresponding tunnel). Furthermore, the SMF may instruct, or configure, the source UPF and the target UPF to establish a forwarding tunnel (e.g. a GTP tunnel such as a GTP-U tunnel) and to perform data forwarding (i.e. the source UPF forwards DL data of the PDU session of the UE to the target UPF), when the source UPF and the target UPF are two different entities.

When the control plane resources for sending control signal (i.e. the instructions/configuration from the control plane function to the source/target UPFs/RAN nodes as described above) are limited, this path switch approach may generate significant, and possibly unaffordable, overhead, for example, when a path switch happens frequently due to frequent handover (which may in turn occur due to high UE mobility and/or an unstable wireless channel between the UE and the RAN).

Accordingly, there is a need for systems and methods which are more efficient when a path switch occurs. The present invention presents systems and methods to enable a communication service that supports efficient communication between a UE and a DN communication. Embodiments of the present invention allow for more efficient path switches.

Before discussing embodiments in more detail, some background terminology will be discussed with respect to the devices and networks which can implement the methods discussed herein.

FIG. 1 is a schematic diagram of an electronic device 1200 that may perform any or all steps of the methods and features described herein, according to different embodiments of the present invention. For example, a UE may be configured as an electronic device. Further, a network element hosting any of the network functions described herein (e.g., a RAN node, a UPF, the CM, etc.) may be configured as the electronic device 1200.

As shown, the device includes a processor 1210, memory 1220, a non-transitory mass storage 1230, an I/O interface 1240, a network interface 1250, and a transceiver 1260, all of which are communicatively coupled via a bi-directional bus 1270. According to certain embodiments, any or all of the depicted elements may be utilized, or only a subset of the elements. Further, the device 1200 may contain multiple instances of certain elements, such as multiple processors, memories, or transceivers. Also, elements of the hardware device may be directly coupled to other elements without the bi-directional bus.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1230 may have recorded thereon statements and instructions executable by the processor 1210 for performing any of the method steps described herein.

Figure 2:
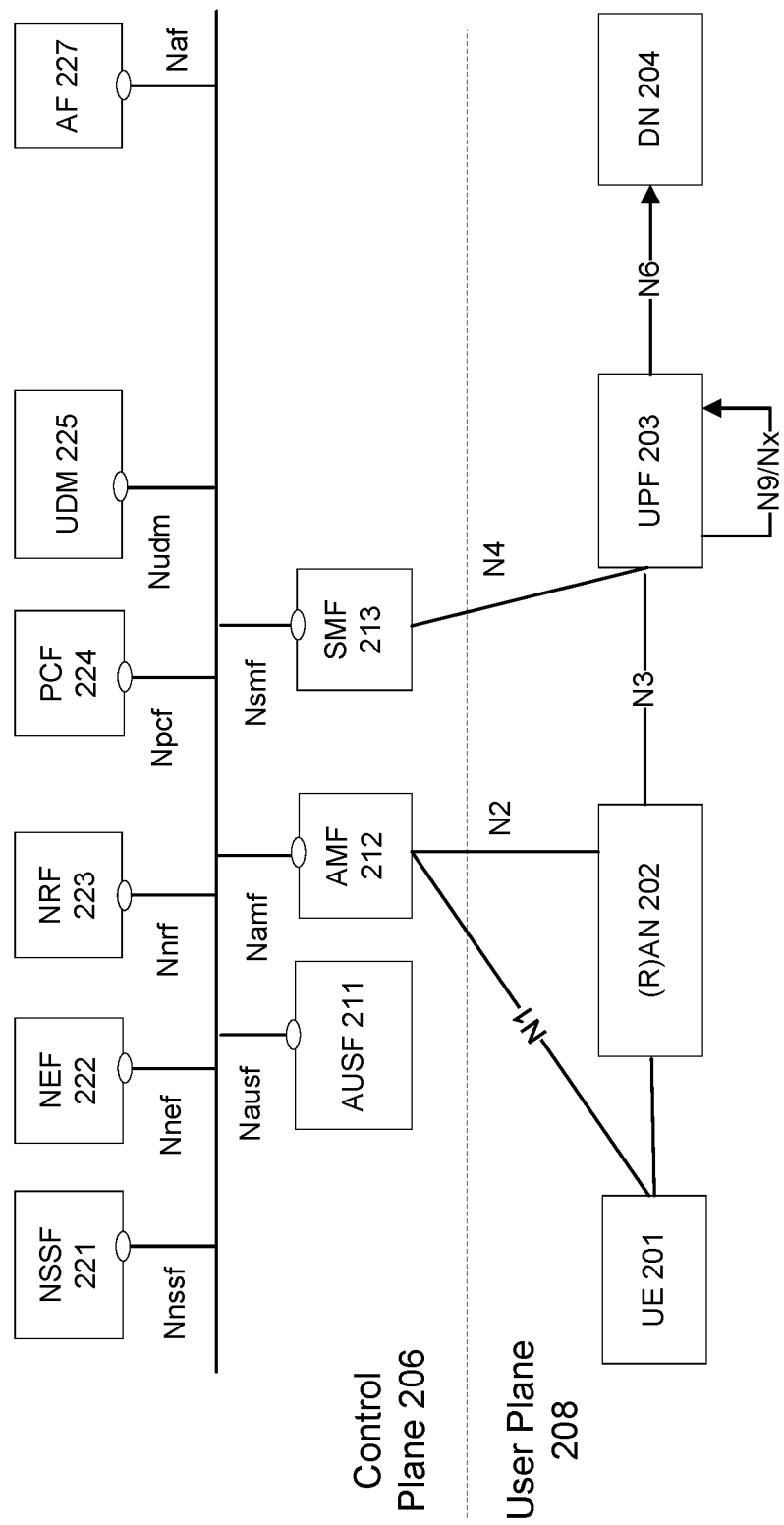
FIG. 2 is a schematic diagram illustrating a service-based view of an example of an enhanced 5GS architecture in accordance with embodiments of the present invention.

FIG. 2 illustrates an example of enhanced 5GS architecture in a non-roaming scenario in accordance with embodiments of the present invention. FIG. 2 depicts logical connections between network nodes and functions, and its illustrated connections should not be interpreted as direct physical connection. The UE 201 forms a radio access network connection with a (Radio) Access Network node (R)AN 202, which is connected to a UPF 203 over a network interface such as an N3 interface. The UPF 203 connects to the DN 204 over a network interface such as an N6 interface. The DN 204 may be a data network used to provide an operator service, or it may be outside the scope of the standardization of the 3GPP (Third Generation Partnership Project), such as the Internet, a network used to provide third party service. In some embodiments, the DN 204 may represent an Edge Computing network or resource, such as Mobile Edge Computing (MEC) network.

The UE 201 also connects to the AMF 212. The AMF 212 is responsible for authentication and authorization of access requests, as well as mobility management functions. The AMF 212 may perform other roles and functions as defined by the 3GPP Technical Specification (TS) 23.501. In a service based view, AMF 212 can communicate with other functions through a service based interface denoted as Namf. The SMF 213 is a network function that is responsible for configuring UP paths for PDU Sessions. In some embodiments, SMF 213 may be responsible for the allocation and management of IP (Internet Protocol) addresses that are assigned to a UE. In some embodiments, SMF 213 may further be responsible for the selection or reselection of the UPF 203 or a particular instance of the UPF 203 for traffic associated with a particular session of UE 201. The SMF 213 may configure packet handling rules (e.g. packet routing & forwarding rules, packet marking rules) in the UPF 203 to support local area network (LAN)-type communication (e.g. 5GLAN communication). Furthermore, the SMF 213 may also perform LAN UE group authentication (e.g. 5GLAN group authentication) and authorization during PDU Session establishment/modification procedure. The SMF 213 may communicate with other functions, in a service based view, through a service based interface denoted as Nsmf. The Authentication Server Function (AUSF) 211 provides authentication services to other network functions over a service based Nausf interface.

The Network Exposure Function (NEF) 222 can be deployed in the network to allow servers, functions and other entities such as those outside a trusted domain to have exposure to services and capabilities within the network. In one such example, the NEF 222 can act much like a proxy between an application server outside the illustrated network and network functions such as the Policy Control Function (PCF) 224, the SMF 213 and the AMF 212, so that the external application server can provide information that may be of use in the setup of the parameters associated with a data session. The NEF 222 can communicate with other network functions through a service based Nnef network interface. The NEF 222 may also have an interface to non-3GPP functions. A Network Repository Function (NRF) 223 provides network service discovery functionality. The NRF 223 may be specific to the Public Land Mobility Network (PLMN) or network operator, with which it is associated. The service discovery functionality can allow network functions and UEs connected to the network to determine where and how to access existing network functions and may present the service based interface Nnrf. PCF 224 communicates with other network functions over a service based Npcf interface and can be used to provide policy and rules to other network functions, including those within the CP. Enforcement and application of the policies and rules is not necessarily the responsibility of the PCF 224, and is instead typically the responsibility of the functions to which the PCF 224 transmits the policy. In one such example the PCF 224 may transmit policy associated with session management to the SMF 213. This may be used to allow for a unified policy framework with which network behavior can be governed. A Unified Data Management Function (UDM) 225 can present a service based Nudm interface to communicate with other network functions and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 225 may be implemented as a UDM Front End (UDM-FE) and a User Data Repository (UDR). The PCF 224 may be associated with the UDM 225 because it may be involved with requesting and providing subscription policy information to the UDR, but it should be understood that typically the PCF 224 and the UDM 225 may be independent functions. The PCF may have a direct interface to the UDR. The UDM-FE receives requests for content stored in the UDR, or requests for storage of content in the UDR, and is typically responsible for functionality such as the processing of credentials, location management and subscription management. The UDR-FE may also support any or all of Authentication Credential Processing, User Identification handling, Access Authorization, Registration/Mobility management, subscription management, and Short Message Service (SMS) management. The UDR is typically responsible for storing data provided by the UDM-FE. The stored data is typically associated with policy profile information (which may be provided by PCF 224) that governs the access rights to the stored data. In some embodiments, the UDR may store policy data, as well as user subscription data which may include any or all of subscription identifiers, security credentials, access and mobility related subscription data and session related data. Application Function (AF) 227 represents the non-data plane (also referred to as the non-user plane) functionality of an application deployed within a network operator domain and within a 3GPP compliant network. The AF 227 interacts with other core network functions through a service based Naf interface, and may access network capability exposure information, as well as provide application information for use in decisions such as traffic routing. The AF 227 can also interact with functions such as the PCF 224 to provide application specific input into policy and policy enforcement decisions. It should be understood that in many situations the AF 227 may not provide network services to other NFs, and instead is often viewed as a consumer or user of services provided by other NFs. An application outside the 3GPP network, can perform many of the same functions as AF 227 through the use of NEF 222.

UE 201 communicates with network functions that are in the User Plane (UP) 206, and the Control Plane (CP) 208. The UPF 203 is a part of the CN UP 206 (DN 204 being outside the 5GCN). (R)AN 202 may be considered as a part of a User Plane, but because it is not strictly a part of the CN, it is not considered to be a part of the CN UP 206. AMF 212, SMF 213 AUSF 211, NEF 222, NRF 223, PCF 224, are UDM 225 are functions that reside within the CN CP 208 and are often referred to as Control Plane Functions. AF 227 may communicate with other functions within CN CP 208 (either directly or indirectly through the NEF 222) but is typically not considered to be a part of the CN CP 208.

Those skilled in the art will appreciate that there may be a plurality of UPFs connected in series between the (R)AN 202 and the DN 204, multiple data sessions to different DNs can be accommodated through the use of multiple UPFs in parallel.

Figure 3:
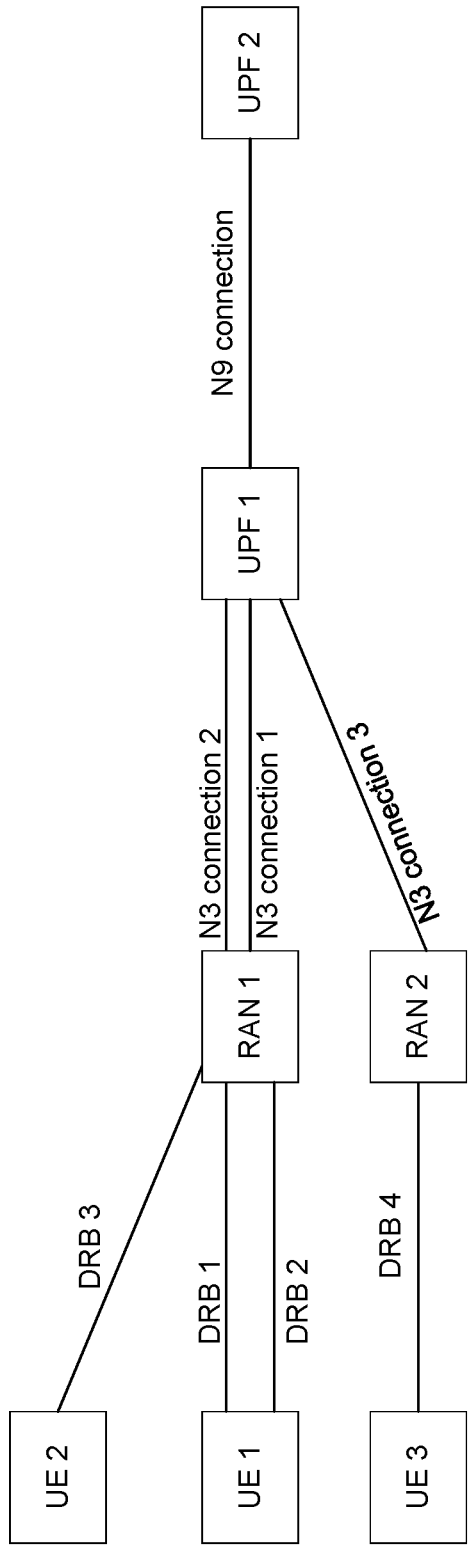
FIG. 3 illustrates of user plane tunnels in accordance with embodiments of the present invention.

FIG. 3 Illustrates user plane tunnels in accordance with embodiments of the present invention. As illustrated in FIG. 3, the user plane path includes a first UPF (UPF 1) that connects to the RAN node (RAN 1) serving the UE (UE 1). The connection between the RAN node and the first UPF is referred to as N3 connection (e.g. N3 connection 1 in the figure) and is supported by a tunnel, e.g. GTP tunnel such as GTP-U tunnel. The first UPF may connect to the DN directly, for example via a so-called N6 interface or connection (not shown). The first UPF may connect to another UE (e.g. UE 3) via a RAN node (e.g. RAN 2). The user plane path may include a second UPF (UPF 2) through which the first UPF connects to the DN or another UE (not shown). The connection between the first UPF and the second UPF is referred to as N9 connection and may be supported by a tunnel, e.g. GTP tunnel such as GTP-U tunnel. The UPF 1 is configured to map or correspond or associate the N9 connection to the N3 connection for transmitting DL data traffic (i.e. data packets targeting or destined to the UE) related to the PDU Session. Embodiments allow for the UPF 1 to transmit a DL data packet received from the N9 connection using the N3 connection toward the UE, based on such a mapping, without requiring the UPF 1 to process the header(s) and/or payload of the data packet (e.g. reading, understanding, or analyzing the header(s) and/or the payload of the data packet). When the UPF 1 receives the DL data packet from the N9 connection, the data packet is carried by or encapsulated in a tunnel packet, e.g. GTP packet, as illustrated in FIG. 4.

The RAN node (RAN 1) serving the UE (UE 1) is configured to map or correspond or associate the N3 connection (e.g. N3 connection 1 in the figure) to one or multiple data radio bearers DRBs (e.g. DRB 1 and DRB 2 in the figure) for the PDU Session. Each DRB is associated with a UE, and/or corresponds to wireless resources allocated to the UE, for the PDU Session. As can be seen, multiple the DRBs (DRB 1 and DRB 2) can be assigned to a UE. Each DRB may map or correspond or associate to one or multiple QoS flows within the DL data traffic (for the UE). In this specification, a DRB is considered to be a tunnel. When the RAN node receives a DL data packet from the N3 connection, the data packet is carried by or encapsulated in a tunnel packet, e.g. GTP packet, as illustrated in FIG. 4.

It is noted a wireless network is typically divided into a RAN and core network. UPFs are typically within the control of the core network, whereas RAN nodes are within the control of the RAN. However, both can form part of a user plane for transporting packets between a UE and a DN. Accordingly, in this specification the term user plane (UP) entity is used to include both UPFs and RAN nodes.

Figure 4:
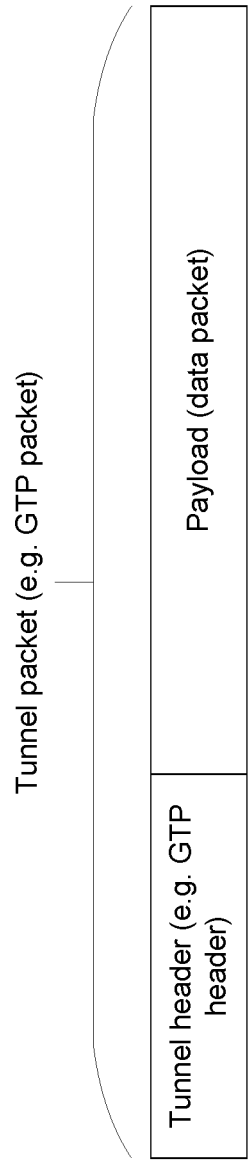
FIG. 4 illustrates a tunnel packet in accordance with embodiments of the present invention.

FIG. 4 illustrates a tunnel packet in accordance with embodiments of the present invention. The tunnel packet has a tunnel header (also referred to as encapsulation header), and the data packet is included in the tunnel packet as payload, as illustrated in FIG. 4. In this specification, a data packet is also referred to as PDU (protocol data unit) having its own header. Thus, a data packet header is equivalent to a PDU header. Further, the terms data, traffic, data traffic, user plane data, user plane traffic are used interchangeably unless clarified otherwise. Thus, the terms data/traffic include data packets (which are also referred to as PDUs). Furthermore, in this specification, for ease of presentation, the terms 'connection' and 'tunnel' are used interchangeably. For example, the N3 connection is equivalent to a N3 tunnel and N9 connection is equivalent to a N9 tunnel. Thus, N3 connection 1 is equivalent to N3 tunnel 1. Further, for or within a PDU Session of a UE, a downlink (DL) data packet is a data packet targeting the UE (e.g. including a UE address in the data packet header as destination address). Such a DL packet may originate from the DN (e.g. an application server in the DN) or from another UE. For or within a PDU Session of a UE, an uplink (UL) data packet is a data packet originated from the UE (e.g. including a UE address in the data packet header as source address). Such an UL packet may target the DN (e.g. an application server in the DN) or another UE.

After receiving a DL data packet from a N3 connection, the RAN node (RAN 1) selects (identifies) a DRB from the DRB(s) corresponding to the N3 connection to use to transmit the DL data packet. A DRB can be identified by DRB ID. RAN 1 makes this selection according to information (e.g. information identifying the tunnel such as TEID (tunnel endpoint identifier), information identifying the quality of service (QoS) flow such as a QoS flow indicator (QFI)) in the tunnel header of the tunnel packet that includes the DL data packet, (e.g. the DRB corresponding to the QoS flow identified in the tunnel header). For example, assuming there is a mapping or correspondence or association between the N3 connection 1 in FIG. 3 and DRB 1, then RAN 1 selects and uses DRB 1 (e.g. the corresponding wireless resources) to transmit the data packet to the UE 1. Advantageously, as will be discussed in more detail below, embodiments allow the RAN node to make such a selection or mapping based on the tunnel header (i.e. information in the tunnel header) without requiring the RAN node to process the payload of the tunnel packet (i.e. the DL data packet), e.g. read, understand, or analyze the PDU header(s) of the DL data packet).

Such a selection or mapping can make a path switch more efficient, according to a first aspect of the disclosure. A first aspect of this disclosure provides for user plane messages between UP entities to be transmitted to affect the behaviour of the user plane, without requiring extensive control plane signaling between control plane functions, and/or between control plane functions and UP entities of the core network. Accordingly, methods and systems according to the first aspect can allow for user plane messages between user plane entities to configure of change connections between UP entities. For example, UP entities can directly communicate with each other to implement or perform a path switch or data forwarding while reducing or minimizing the amount of control plane signaling compared to prior art techniques. Example embodiments will be discussed which can configure or preconfigure connections between UP entities.

For example, embodiments provide for preconfiguring a connection between a target RAN node and a target UPF (e.g., a N3 connection) to be similar to an existing tunnel between a source UPF and a source RAN node. Further, a forwarding tunnel between the source UPF and the target UPF can be preconfigured too. Accordingly, embodiments for this aspect propose systems and methods for performing path switch which reduces or minimizes control plane signalling in a wireless system, e.g. in the control plane of a 3GPP system. In some embodiments, tunnels may be preconfigured according to UE mobility prediction. For example, the network may predict potential target RAN nodes according to UE mobility and preselects target UPFs for each potential target RAN node. Further, the system then preconfigures the tunnels between a target RAN node and a target UPF. In this context, it is noted that preconfiguration implies the connections between UP entities are configured in advance of when they are needed (e.g., the connections exist and are available for use) at the time when a path change (e.g. path switch) is needed, as opposed to configuring them at the time when a path change is needed. This can reduce latency and speed up the handover process, making the system faster.

A second aspect of this disclosure provides for the use of a shared user plane tunnel (e.g. a tunnel or connection between two UP entities and shared/used by multiple PDU Sessions or UEs). As described above, a reader may have assumed that the N3 tunnel and the N9 tunnel were each dedicated to a first PDU Session. When data traffic is transported between the UE and the DN (or another UE) along the user plane path, through the UPFs, using dedicated user plane connections, then simple mappings between N3/N9 tunnels, and between N3 connections and DRBs can be used.

However, embodiments according to this second aspect allow for shared tunnels which are shared with other PDU Session(s). Those other PDU sessions may belong to the same UE (as that of the first PDU session) or to a different UE. When the N3 tunnel and/or the N9 tunnel is(are) not dedicated to the PDU Session, i.e. when they can be potentially shared by another PDU Session, the above described user plane handling approach using direct mappings (e.g. only according to tunnel information (e.g. TEIDs, DRB ID), or only according to tunnel information (e.g. TEID, DRB ID) and QoS information (e.g. QFI)) needs some enhancements to allow for the efficient/effective use of the shared tunnels For example, referring to FIG. 3, when the N3 tunnel (e.g. N3 tunnel 1), is not dedicated to a PDU Session of the UE (the UE 1), the RAN node (RAN 1) serving the UE, is not able to identify the right DRB(s) (e.g. DRB 1 and DRB 2) to use for transmitting DL data packets received from the N3 tunnel and belonging/related to the PDU Session of the UE as the data packets may potentially belong/relate to a different PDU Session and/or may even target a different UE (e.g. UE 2). When the N9 tunnel is not dedicated to the PDU Session, there could be multiple N3 tunnels (e.g. N3 connections 1, 2, 3) being mapped to/from the N9 connection at the first UPF (UPF 1), and the multiple N3 tunnels may be for different PDU Sessions and may connect to a different RAN node (e.g. RAN 2). As a result, the first UPF is not able to identify which of the N3 tunnels to use to transmit the DL data packets received from the N9 tunnel properly toward the UE. Thus, an aspect of this disclosure provides systems and methods for differentiating traffic within a shared user plane tunnel.

Therefore, embodiments according to the second aspect of this disclosure allow a user plane entity (e.g. RAN node or a UPF) to route a data packet received from a shared user plane connection (e.g. an N3 connection or an N9 connection), properly towards the destination (e.g. a UE or an application server in the DN). For example, such a user plane entity is configured to identify a proper DRB at a RAN node, or a user plane connection at a UPF, to use for transmitting the data packet, according to information in the tunnel header (i.e. header of the tunnel packet that includes the data packet as payload). Advantageously, such a UPF is configured to make such an identification without processing the data packet (e.g. reading, understandings, or analyzing the PDU header(s) of the data packet).

Embodiments according to the first aspect will now be discussed.

Examples will be discussed in which a UE is handed over from a source RAN node to a target RAN node. Before the handover, the user plane path of the UE (more specifically, for example, a PDU Session of the UE) includes the source RAN node and a source UPF. For ease of presentation, the source UPF can be referred to as the peer UPF of the source RAN node. In the user plane path, the source RAN node and the source UPF are connected through an N3 connection. The connection can be implemented using a tunnel, e.g. GTP tunnel such as GTP-U tunnel.

After the handover, a path switch procedure takes place, during which the user plane path of the UE is changed from a first path through the source RAN node and the source UPF to a second path through the target RAN node and the target UPF.

After the path switch, the user plane path of the PDU Session of the UE (i.e., the second path) includes the target RAN node and the target UPF. For ease of presentation, the target UPF can be referred to as the peer UPF of the target RAN node. In the user plane path, the target RAN node and the target UPF are connected through an N3 connection. The connection can be implemented using a tunnel, e.g. GTP tunnel such as GTP-U tunnel.

The second path, e.g., the connection between the target RAN node and the target UPF, may be preconfigured, e.g. before the handover happens, by a network function (e.g. an OAM function, or a control plane function such as SMF). When configuring the connection (which may be a shared connection/tunnel, as described below in the second aspect of this disclosure), the network function may provide (e.g. via a message or through calling an API exposed by the target RAN node or the target UPF) parameters related to the connection to the target RAN node and to the target UPF. The parameters provided to the target RAN node may include any of the following: information identifying the connection, e.g. TEID associated to the endpoint(s) of the connection at the target RAN node side and/or at the target UPF side, and information such as network address and/or port number related to the connection end point(s) at the target RAN node side and/or at the target UPF side; the parameters may further include an identifier of the target UPF. The parameters provided to the target UPF may include any of the following: information identifying the connection, e.g. TEID associated to the endpoint(s) of the connection at the target RAN node side and/or at the target UPF side, and information such as network address and/or port number related to the connection end point(s) at the target RAN node side and/or at the target UPF side; the parameters may further include an identifier of the target RAN node.

The source UPF and the target UPF may be the same entity or may be different entities. When the source UPF and the target UPF are two different entities, during the path switch, the source UPF may forward the received DL traffic/data targeting at/addressed to the UE to the target UPF using a preconfigured connection (e.g. forwarding tunnel).

The connection between the source UPF and the target UPF for the traffic/data forwarding may be implemented using a tunnel, e.g. GTP tunnel such as GTP-U tunnel, and may be preconfigured, e.g. before the handover happens, by a network function (e.g. an OAM function, or a control plane function such as SMF). In some embodiments, the tunnel can be a dedicated tunnel, which is dedicated for a particular PDU session. In other embodiments, the tunnel can be a shared tunnel (for example, as discussed below in the second aspect of this disclosure). The network function may be the same entity that configures the connection between the target RAN node and the target UPF. When configuring the connection, the network function may provide (e.g. via a message or through calling an API exposed by the source UPF or the target UPF) parameters related to the connection to the source UPF and to the target UPF. The parameters provided to the source UPF may include any of the following: information identifying the connection, e.g. TEID associated to the endpoint(s) of the connection at the source UPF side and/or at the target UPF side, and information such as network address and/or port number related to the connection end point(s) at the source UPF side and/or at the target UPF side; the parameters may also include an identifier of the target UPF. The parameters provided to the target UPF may include any of the following: information identifying the connection, e.g. TEID associated to the endpoint(s) of the connection at the source UPF side and/or at the target UPF side, and information such as network address and/or port number related to the connection end point(s) at the source UPF side and/or at the target UPF side; the parameters may also include an identifier of the source UPF.

In some embodiments, the connection between the target RAN node and the target UPF and the connection between the source UPF and the target UPF (if the source UPF and the target UPF are two different entities) are preconfigured as bidirectional connections. In other words, a single bidirectional connection between two user plane entities is used for both the UL and DL of a PDU session. In some embodiments, during a path switch the target RAN node sends an UL data packet to the target UPF using the connection. This packet may be a real UL data (if the target RAN has received an UL data packet from the UE) or a dummy packet (with a UE address being as the source address, and, for example, having zero-length payload) if the target RAN has not received a UL data packet. Either way, receiving this UL data packet triggers the target UPF to bind (or associate) the connection to the DL data (of or related to the PDU session) of the UE, i.e. for transmitting the DL data toward the UE. After the binding, the target UPF sends DL data targeting at/addressed to the UE (which arrives at the target UPF) towards the UE using the connection. In some embodiments, during a path switch the target RAN node sends a UP message (e.g. a GTP message) to the target UPF using the connection. Receiving this UP message from the connection triggers the target UPF to bind (or associate) the connection to the DL data (of or related to the PDU session) of the UE, i.e. for transmitting the DL data toward the UE. After the binding, the target UPF sends DL data targeting at/addressed to the UE (which arrives at the target UPF) towards the UE using the connection. If the target RAN has received a UL data packet from the UE, the target RAN can send the UL data packet together with the UP message to the target UPF, e.g. the UP message is a GTP message (as indicated in the GTP header) and the UL data packet is included in the GTP packet as payload.

In other embodiments, unidirectional connections can be used. In such embodiments, the UL packets and the DL data are transmitted using two different unidirectional connections (one for UL and one for DL), both of which are preconfigured. The two connections are associated to each other. During path switch described above, the target RAN nodes sends the UL data packet (or the UP message) using a first connection (the one for UL), and the target UPF binds a second connection (the one for DL) corresponding to the first connection from which it receives the UL data packet (or the UP message) to the DL data (or related to the PDU Session) of the UE. After the binding, the target UPF sends DL data targeting at/addressed to the UE towards the UE using the second connection.

In some embodiments, during a path switch, the source RAN node sends a UP message to the source UPF using the old connection to trigger the source UPF to perform data forwarding to the target UPF (in the context of data forwarding, the target UPF is also referred to as data forwarding target). Once triggered, the source UPF forwards DL data targeting at/addressed to the UE to the target UPF. The UP message may include information, e.g. an identifier or a network address of the target UPF. In the case of an N2 handover, in some embodiments DL packet can piggyback on such message and sent back to the source UPF for being forwarded to the target UPF. Using the information (e.g. an identifier or a network address) of the target UPF included in the message received from the source RAN node, the source UPF identifies the corresponding forwarding tunnel between the source UPF and target UPF and forwards DL data targeting at/addressed to the UE (which arrives at the source UPF) to the target UPF using the forwarding tunnel.

UP message as a trigger for a tunnel binding, as well using UP message as a trigger for data forwarding will now be discussed, according to embodiments described in this specification.

When a connection between two UP entities (e.g. between the source RAN node and the source UPF, or between the target RAN node and the target UPF) are implemented as a GPT tunnel (e.g. a GTP-U tunnel), the trigger of (i.e. the UP message for) tunnel binding and the trigger of (i.e. the UP message for) data forwarding can depend on the version of GTP used.

A first example will be discussed for GTP version 1. GTP version 1 allows user plane data to piggyback on signalling messages (or, in other words, allow signalling messages to piggyback on user plane data) between UP entities. In embodiments using GTP version 1, a UP message, e.g. in the form of GTP packet, can trigger a tunnel binding. In such UP message, the message type field of the GTP header indicates it is a message for triggering tunnel binding. Similarly, the trigger for data forwarding can also be a UP message, e.g., in the form of GTP packet, in which the message type field of GTP header indicates it is a message for triggering data forwarding. In some embodiments, an extension header may be used to carry/include information or parameters (e.g. information of the data forwarding target such as an identifier or a network address in the case of triggering data forwarding, information of the UE such as a UE ID or a UE address in the case of tunnel binding) associated to the UP message. The next extension header type field right before the extension header may be set to a value indicating the content of the extension header is related to the trigger of data forwarding or related to the trigger of tunnel binding or to the tunnel binding, or contains parameters associated/ related to the trigger of data forwarding or to the data forwarding (e.g. information of the data forwarding target such as identifier or a network address) or related to tunnel binding (e.g. information such as ID or network address of the UE or UE group). In addition, the Extension header flag is set to indicate one or more extension header(s) are present.

In some embodiments, the two UP messages respectively for triggering data forwarding and tunnel binding can share the same message type. In which case the purpose of the trigger or the action (e.g. data forwarding and/or tunnel binding) to be triggered can be indicated or differentiated by an action indicator field in an extension header (e.g. the PDU Session container header that includes FQI), and the extension can further include information or parameters associated to the trigger(s) or the triggered action(s) as described above. An example is illustrated below in FIG. 5.

A second example will be discussed for GTP version 2. In some such embodiments, the trigger for a tunnel binding can be a UP message, e.g. in the form of GTP packet, in which the message type field of the GTP header indicates it is a message for triggering tunnel binding. The payload includes the information or parameters related/associated to the trigger (or triggered action) as described above. In such embodiments, the trigger for data forwarding can be a UP message, e.g. in the form of GTP packet, where the message type field of GTP header indicates it is a message for triggering data forwarding. The payload includes the information or parameters related/associated to the trigger (or triggered action) as described above.

In other embodiments for GTP version 2, the two triggers can share the same message type, and be indicated or differentiated by a separate action indicator field in the header or in the payload.

Figure 5:
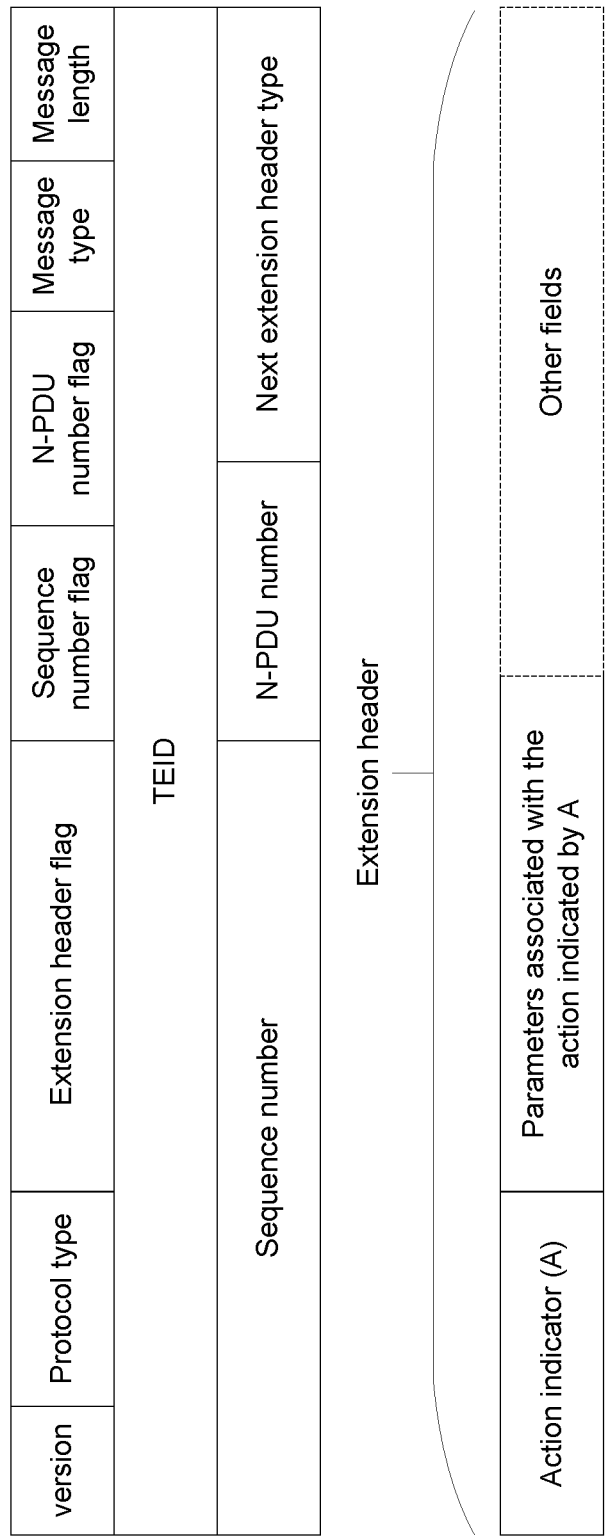
FIG. 5 illustrates an enhanced GTP tunnel version 2 header illustrating triggers for path switch, and data forwarding, according to an embodiment of the present invention.

FIG. 5 illustrates an enhanced GTP tunnel version 1 header illustrating triggers for tunnel binding, and data forwarding, according to an embodiment. In the example shown in FIG. 5, the message type may indicate the message is a trigger (e.g. by including a message type of 'start marker') for triggering certain action at the receiver side, e.g. a UPF. The action indicator (A) field indicates what action (e.g. data forwarding, tunnel binding) is to be triggered at the receiver side. The next field sets out the parameters associated with the action indicated by the action indicator (A) field and includes the parameters associated with the action indicated in the action indicator (A) field. The receiver will use the parameters in this field to perform the action indicated in the action indicator (A) field. For example, if the action indicator field indicates a data forwarding action, the parameters associated with the action may include information, e.g. an identifier or network address, of the target of the data forwarding (i.e. data forwarding target); if the action indicator field indicates a tunnel binding action, the parameters associated with the action may include information, e.g. an identifier or network address, of the UE. It is noted that FIG. 5 only illustrates the fields of the Tunnel Header and does not show the payload (which can be a data packet).

Figures 6, 7:
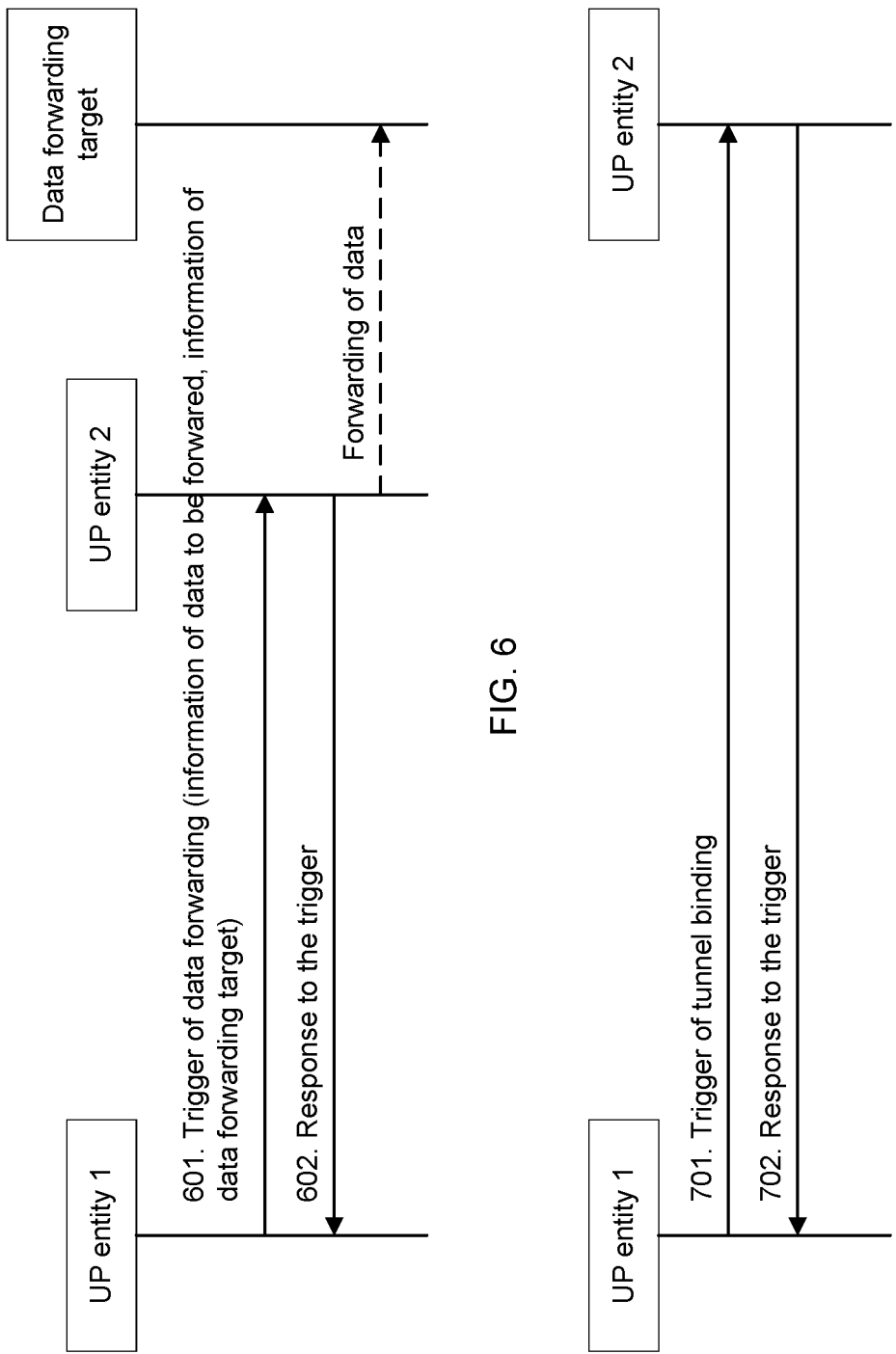
FIG. 6 illustrates a Procedure of UP message triggered data forwarding in accordance with embodiments of the present invention.
FIG. 7 illustrates a Procedure of UP message triggered tunnel binding in accordance with embodiments of the present invention.

FIG. 6 illustrates a procedure of UP message triggered data forwarding in accordance with embodiments of the present invention. At step 601, the UP entity 1 (e.g. the source RAN node during path switch as a result of handover) sends a UP message to the UP entity 2 (e.g. the source UPF). The UP message is to trigger the UP entity 2 to send the data that should be sent to the UP entity 1 to another entity (i.e. a data forwarding target), e.g. the target UPF during path switch as a result of handover, that is different from the UP entity 1. The data to be forwarded is not necessarily data whose final destination is the UP entity 1. It can be data that is routed via the UP entity 1 toward the final destination (e.g. a UE). The UP message 601 may be a trigger of data forwarding and may have a format as described above. The UP message includes information of the data forwarding target, e.g. an identifier or a network address of the data forwarding target, a DNN associated with the data forwarding target, which may identify or may be used to identify the data forwarding tunnel to be used for data forwarding. The UP message may further include information identifying the traffic to be forwarded or information identifying the PDU Session that the traffic to be forwarded is related to, e.g. any of UE ID, UE network address, identifier of the PDU Session, DNN, S-NSSAI. As the UP message is included or indicated in the tunnel header, the UP entity 1 may include a data packet in the UP message (or, in other words, piggyback the UP message on the data packet) by including a data packet as the payload of the tunnel packet. The data packet may be a data packet that was sent to UP entity 1 (e.g. by the UP entity 2) but should be forwarded to the data forwarding target. The UP message may be sent using a tunnel preconfigured between the UP entity 1 and the UP entity 2. The tunnel may be preconfigured by a network management function (e.g. an OAM function) or a network control function (e.g. SMF), as described above, and may be shared by multiple PDU Sessions or UEs as described in the second aspect of this disclosure.

At step 602, the UP entity 2 sends a response to the UP entity 1 to acknowledge the receipt of the message. The response is a UP message and implies that the UP entity 2 will no longer send data to the UP entity 1. The response may be sent using a tunnel preconfigured between the UP entity 1 and the UP entity 2. The tunnel may be preconfigured by a network management function (e.g. an OAM function) or a network control function (e.g. SMF), as described in the first aspect of this disclosure. The tunnel may be the tunnel from which the UP entity 2 receives the UP message in step 601. In some embodiments, the response may be in the form of an end marker (i.e. the message type field of the tunnel header indicates the message is an end marker). The UP entity 2 starts to perform data forwarding according to the UP message received in step 601. That is, the UP entity 2 sends the data traffic identified in the message or related to the PDU Session identified in the message (the data traffic in view of the UP entity 2 before step 601 should be sent to the UP entity 1) to the data forwarding target identified in the message (rather than to the UP entity 1). If a data packet piggybacks on the UP message, the UP entity 2 sends the data packet to the data forwarding target as part of the data forwarding.

During the data forwarding, the data may be sent from the UP entity 2 to the data forwarding target using a tunnel preconfigured between the UP entity 2 and the data forwarding target. The UP entity 2 may identify the tunnel using the information of the data forwarding target in the UP message received in step 601. The tunnel may be preconfigured by a network management function (e.g. an OAM function) or a network control function (e.g. SMF), as described in the first aspect of this disclosure. In some cases, the UP entity 2 may itself be the data forwarding target, that is, the UP entity 2 may be indicated in the UP message as the data forwarding target. In that case, the UP entity 2 does not perform the data forwarding.

In some embodiments, the UP message triggered data forwarding (as illustrated in FIG. 6) can be used to modify/update/change a user plane path or to implement/support a user plane path modification/change/update (such as path switch) for a PDU Session, e.g. during a procedure of PDU Session modification or during handover (or as a result of handover, as illustrated in FIGS. 9-12, 14-17).

Figure 8:
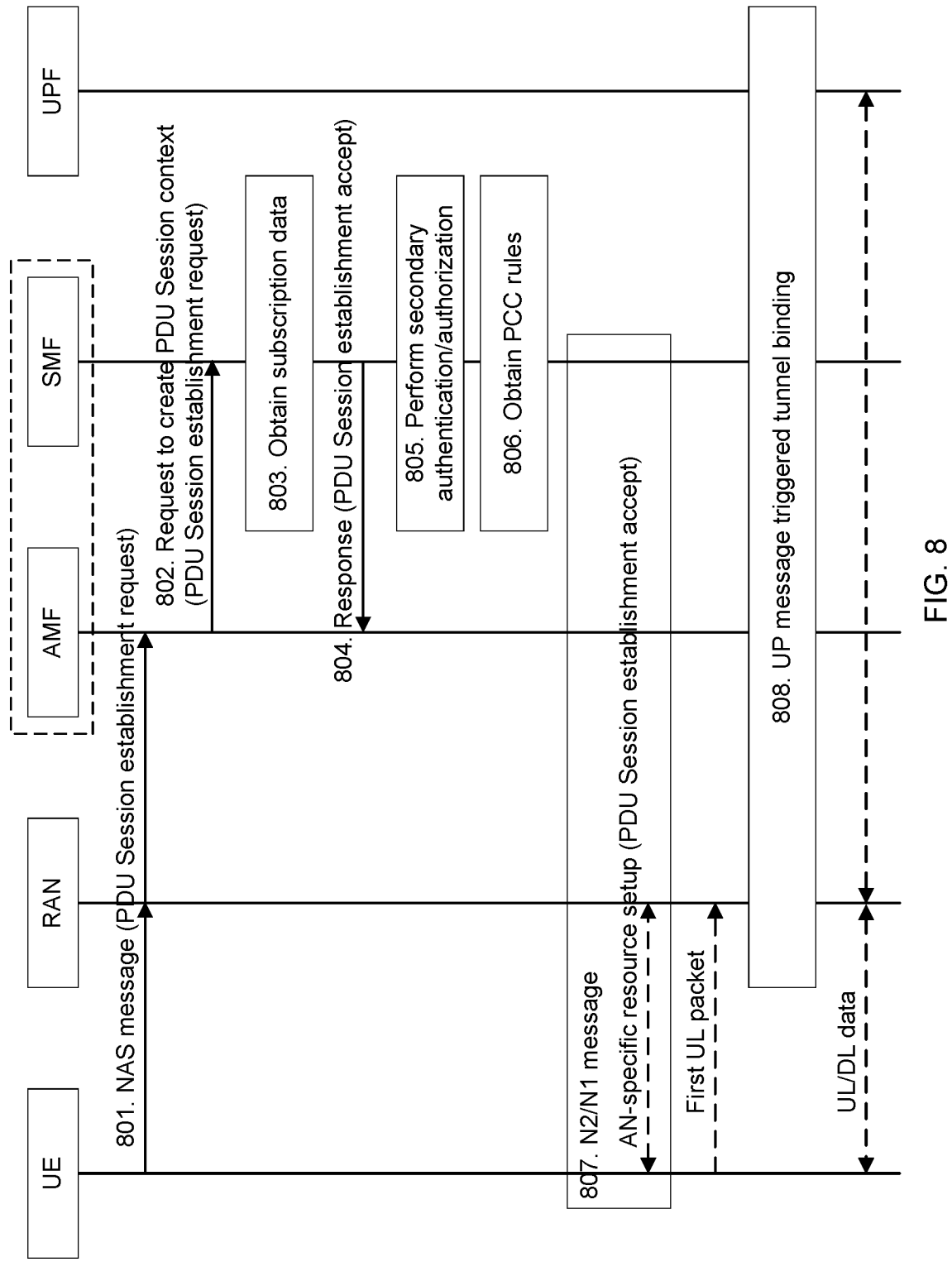
FIG. 8 is a call flow diagram illustrating a procedure of PDU Session Establishment in accordance with embodiments of the present invention.

FIG. 7 illustrates a Procedure of UP message triggered tunnel binding in accordance with embodiments of the present invention. At step 701 the UP entity 1 (e.g. the target RAN node during path switch as a result of handover) sends a UP message to the UP entity 2 (e.g. the target UPF during path switch as a result of handover). The UP message may include or be associated with information that identifies a traffic flow (such as DL traffic targeting at the UE (and related to a PDU session of the UE) and/or related to a DN) or a PDU Session that the tunnel binding is related to. The UP message 701 may be included or indicated in the tunnel header and is to trigger the UP entity 2 to send the traffic identified in the UP message or traffic related to the PDU Session identified in the UP message to the UP entity 1. The UP message may be a trigger of tunnel binding and may have a format as described above. The information that identifies the traffic flow or the PDU Session may include any of the following: a UE ID identifying the UE, a UE group ID identifying the UE group that the UE belongs to, a network address of the UE or the UE group, a PDU Session ID, a DNN identifying the DN that the traffic is related to. The UP entity 1 may obtain these information from a network management or control function such as SMF, when the PDU Session is established (e.g. as illustrated in FIG. 8, step 807) or modified (during the procedure establishing or modifying the PDU Session). In some embodiments, the UP entity 1 may obtain part of information (e.g. the network address of the UE or the UE group) from the PDU header of a data packet that the UP entity 1 receives. In some embodiments, a data packet may piggyback on the UP message as described above. The data packet may be related to the traffic flow or the PDU Session identified in the UP message. For example, the data packet is UL data packet with the UE network address or the UE group network address being include as the source address in the PDU header of the data packet. The data packet may be data packet received by the UP entity 1 or a dummy data packet that the UP entity 1 generates by itself. The UP message 701 may be sent using a tunnel preconfigured between the UP entity 1 and the UP entity 2. The tunnel may be preconfigured by a network management function (e.g. an OAM function) or a network control function (e.g. SMF), as described above.

At step 702. The UP entity 2 sends a response 702 to the UP entity 1 to acknowledge the receipt of the message. In some embodiments, the UP entity 1 may keep performing step 701 until it receives a response 702 from the UP entity 2. In some embodiments, for example, when the UP entity 2 is an anchor UPF, after receiving the UP message in step 701, the UP entity 2 activates UP handling rules (e.g. PDR, FAR, QEF (QoS Enforcement Rules), traffic marking rules, etc.) that are related to the traffic or PDU Session indicated in the UP message and associates the UP handling rules to the tunnel from which the UP entity 2 received the UP message 701. The UP entity 2 then applies the activated UP handling rules to traffic received from the tunnel. Triggered by the UP message 701 (or in other words, recipient of the UP message 701), the UP entity 2 performs tunnel binding, i.e. binds a tunnel to the traffic or the PDU Session indicated in the UP message 701, and starts to sends the traffic, or traffic related to the PDU Session, identified in the UP message received step 701 to the UP entity 1 using the tunnel. This tunnel is preconfigured between the UP entity 1 and the UP entity 2, e.g. by a network management function (e.g. an OAM function) or a network control function (e.g. SMF) as described in the first aspect of this disclosure. It may be the same as, or a tunnel corresponding to the tunnel from which the UP entity 2 receives the UP message in step 701. In some embodiments, when the UP entity 2 is an anchor UPF, the UP entity 2 associates the activated UP handling rules to this tunnel and applies the rules to traffic to be sent to (using) this tunnel, as described below.

In some embodiments, the UP message triggered tunnel binding (as illustrated in FIG. 7) can be used to establish user plane path or implement/support user plane path establishment during establishment of a PDU Session, as illustrated in FIG. 8, or during a service request procedure. In some embodiments, the UP message triggered tunnel binding can be used to modify/update/change a user plane path or to implement/support a user plane path modification/change/update (such as path switch) for a PDU Session, e.g. during a procedure of PDU Session modification or during handover (or as a result of handover, as illustrated in FIGS. 9-12, 14-17).

As an alternative to the trigger of tunnel binding example procedure described above, the target RAN node may simply send a UL data packet (received from the UE) to the target UPF, and the UL data packet may then trigger the target UPF to bind the preconfigured tunnel to the UE (or the PDU Session of the UE) for sending DL data to the UE. If the target RAN node has not received any UL data packet from the UE, the target RAN node may send a dummy UL data packet (or an empty UL data packet) for the UE (or, on behalf of the UE) to the target UPF, which then triggers the tunnel binding. The target UPF drops the dummy UL data packet (or the empty UL data packet). In this alternative approach, no user plane message is used.

An example procedure of PDU Session Establishment in accordance with embodiments of the present invention will now be discussed. In some embodiments, the UE sends a request to the core network to establish a PDU Session before starting communication. The UE sends a request for PDU Session establishment to a connectivity manager (CM) via the serving RAN node. In some embodiments, the request may include the DNN (Data Network Name), S-NSSI (Single Network Slice Selection Assistance Information) that the PDU Session is targeting. In some embodiments, the request may also include an identifier of the UE, e.g. GPSI, or SUPI. In some embodiments, the CM includes an AMF and an SMF, and the AMF receives the PDU Session establishment request from the UE and then requests the SMF to establish the PDU Session by sending the PDU Session establishment request or the information in or associated to the PDU Session establishment request to the SMF. The SMF performs authentication and/or authorization for the PDU Session establishment. To do so, the SMF may obtains user subscription data (e.g. including an identifier identifying a UE group that the UE belongs to, the information of subscription of the UE to a slice (identified by an S-NSSAI or NSSAI (Network Slice Selection Assistance Information)) or a DN (identified by a DNN)) from the UDM and authenticate/authorize the PDU Session establishment according to the subscription data. In some embodiments, the SMF also interacts with a DN-AAA server to perform secondary authentication/authorization. The SMF then obtains PCC (Policy and Charging Control) rules related to the PDU Session (e.g. related to the target DNN, target S-NSSAI, the GPSI (Generic Public Subscription Identifier)/SUPI (Subscription Permanent Identifier), or the UE group ID received from the UDM) from the PCF. The PCC rules may include QoS related policies and/or traffic routing policies (e.g. whether or not to use a pre-configured, and potentially shared, N3 tunnel for the PDU Session, and, if the N3 tunnel is shared, the traffic differentiation information as described in the second aspect of this disclosure). The SMF may provide information related to the PCC rules (e.g. the QoS policies and the traffic routing policies) to the RAN node. The RAN node may according to the information received from the SMF configure one or more DRB and DRB/tunnel mapping. The RAN node may interact with the UE to setup RAN-specific resources for the PDU Session. The RAN node may perform the UP message triggered tunnel binding procedure with its peer UPF, as described above). In this procedure, a UL data packet may piggyback on the UP message sent to the peer UPF of the RAN node, and the RAN node may include an identifier of the UE and/or a network address (e.g. an IP address or an Ethernet address) of the UE as associated parameters in the UP message. The network address may be allocated by the SMF to the UE and provided from the SMF to the RAN node. The SMF may send the network address to the UE as part of a PDU Session establishment accept message via the RAN node. The procedure of PDU Session Establishment is further illustrated in FIG. 8.

FIG. 8 is a call flow diagram illustrating a procedure of PDU Session Establishment in accordance with embodiments of the present invention. In FIG. 8, the AMF and the SMF are shown as two separate entities. In some embodiments, the AMF and the SMF may be integrated into a single entity, e.g. a connectivity manager (CM), in which case the interaction between the AMF and the SMF may not happen or may be internal to components or subroutines within the CM.

At step 801, the UE sends a NAS message to the AMF via a RAN node, e.g. a RAN node that is serving the UE. The NAS message includes a DNN, a S-NSSAI, a PDU Session ID, an old PDU Session ID, a PDU Session establishment request, etc. The PDU Session establishment request includes a PDU Session ID, PDU Session type, SSC mode, etc. This step is similar to the step 1 in FIG. 4.3.2.2.1-1 of 3GPP TS 23.502 V16.2.0.

At step 802. The AMF requests the SMF to create PDU Session context by sending an identify of the UE (e.g. SUPI), AMF ID, and information in the NAS message received in step 801, e.g. DNN, S-NSSAI, PDU Session ID, and PDU Session establishment request to a selected SMF. The SMF is selected according to the DNN and S-NSSAI, and the old PDU Session ID if it exists, in the NAS message received from the UE. This step is similar to the steps 2 and 3 in FIG. 4.3.2.2.1-1 of 3GPP TS 23.502 V16.2.0.

At step 803, the SMF obtains user subscription data from the UDM (not shown) by providing the DNN, S-NSSAI, SUPI to the UDM and receiving the corresponding subscription data from the UDM. The subscription data may include the Allowed PDU Session Type(s), Allowed SSC mode(s), default 5QI and ARP, subscribed Session-AMBR, SMF-Associated external parameters. The SMF authorizes the PDU Session establishment by checking the validity of the UE request with respect to the subscription data. This step is similar to the step 4 in FIG. 4.3.2.2.1-1 of 3GPP TS 23.502 V16.2.0.

At step 804 the SMF responds to the AMF. The response indicates whether the PDU Session context is created or whether the PDU Session establishment request is accepted or rejected, according to the user subscription data received in step 803 and/or local configuration. In the case of acceptance, the response includes the context ID; in the case of rejection, the response indicates the cause. This step is similar to the step 5 in FIG. 4.3.2.2.1-1 of 3GPP TS 23.502 V16.2.0

At step 805, the SMF may perform secondary authentication and authorization for the PDU Session establishment. This step is similar to the step 6 in FIG. 4.3.2.2.1-1 of 3GPP TS 23.502 V16.2.0.

At step 806, the SMF obtains PCC rules related to the PDU Session from a selected PCF. This step is similar to the steps 7a and 7b in FIG. 4.3.2.2.1-1 of 3GPP TS 23.502 V16.2.0.

At step 807, the SMF sends an N2 message to the RAN node via the AMF. The message includes an N1 message for the UE. After receiving the N2 message, the RAN node sends/transfers the N1 message to the UE. The N2 message may include PDU Session ID, QFI(s), QoS Profile(s), CN Tunnel Info, S-NSSAI from the Allowed NSSAI, DNN, etc. The CN tunnel information may include traffic differentiation information (TDI, which can include, e.g., UE ID, UE group ID, PDU Session ID, UE network address, UE group network address, as described with respect to the second aspect of this disclosure) to be applied or used on the data packets received from the CN tunnel (i.e. the N3 tunnel), which may be identified by a TEID and/or corresponding to the DNN, e.g. when the CN tunnel is a shared tunnel for the DN identified by the DNN. The RAN may, according to the received information, set up RAN resources with the UE for the PDU Session, e.g. configure DRBs and provide related parameters to the UE and create/generate DRB and CN tunnel mapping. The mapping can be between DRB and TEID+QFI or between DRB and TEID+QFI+traffic differentiation information (e.g. as described below). The N1 message includes or is a PDU Session Establishment Accept message, which may include an S-NSSAI from the Allowed NSSAI. Multiple QoS Rules, QoS Flow level QoS parameters if needed for the QoS Flow(s) associated with those QoS rule(s) and QoS Profiles may be included in the PDU Session Establishment Accept. The PDU Session establishment accept message may include a network address (e.g. an IP address or an Ethernet address) allocated to the UE. The SMF may provide the network address to the RAN in the N2 message as part of traffic differentiation information described above. This step is similar to the steps 11-14 in FIG. 4.3.2.2.1-1 of 3GPP TS 23.502 V16.2.0 except for the content of CN tunnel information in the N2 message.

In some embodiments, during or after step 807, AN specific resource setup occurs based on the information in the N2/N1 messages. Once the PDU session establishment is accepted, the UE may send the first UL packet to the RAN node.

At step 808, the RAN node sends a UP message to its peer UPF (i.e. the UPF that terminates the N3 connection) to trigger tunnel binding at its peer UPF, using the UP message triggered tunnel binding procedure described in accordance with FIG. 7. A UL data packet (e.g. the first UL packet described above) received by the RAN node from the UE may piggyback on the UP message. After this step, UL/DL data traffic is transported to/from the UPF via the RAN node. The UPF in the FIG. 8 is the peer UPF of the RAN node. If the UPF is not an anchor UPF that has an interface or connection to the DN, the UPF may in turn initiate the UP message triggered tunnel binding procedure toward the anchor UPF, by sending a UP message using a preconfigured tunnel toward the anchor UPF, which is not shown. Tunnel binding may happen in a cascaded manner (have a chain effect) until the anchor UPF is reached. The anchor UPF performs tunnel binding according the UP message as described in the procedure associated to FIG. 7. After that, the UP path is fully established.

In some embodiments, step 808 may be performed as a substep of step 807. For example, before the RAN node sends the N1 message to the UE, or before the RAN interacts with the UE for setting up RAN-specific resource, or before the RAN node responds/acknowledges (which is similar to the step 14 in FIG. 4.3.2.2.1-1 of 3GPP TS 23.502 V16.2.0 and is not shown in FIG. 8) to the AMF for the N2 message. In other words, step 808 can be performed after the RAN node receives the N2 message, but before or concurrent to the N1 message transfer from the RAN node to the UE.

FIG. 8 illustrates that UP message triggered tunnel binding can be used to establish user plane path (step 808) during establishment of a PDU Session. Following a similar principle, the UP message triggered tunnel binding can be used to establish user plane path for a PDU Session during a service request procedure, where the UE is transitioned to a connected state from an idle state and the user plane path (including N3 connection between the serving RAN node of the UE and a UPF in the core network) is configured or activated to be used for the PDU Session. During the service request procedure, parameters associated to the UP message triggered tunnel binding can be provided from the SMF to the RAN node (as part of a N2 message) for the RAN node to initiate the procedure of UP message triggered tunnel binding. This is similar to the step 808 in FIG. 8.

Methods and systems for performing handover according to the first aspect will now be discussed, according to embodiments. Before performing a handover, data packets are transported between the UE and an anchor UPF via the source RAN and the source I-UPF (e.g., a peer UPF of the source RAN node). A source I-UPF (Intermediate UPF) is a UPF intermediate to the RAN node and the anchor UPF. Embodiments allow for a handover to be prepared and then executed, using an Xn interface, without involvement of the core network. During the handover execution, the source RAN node forwards data packets (e.g. DL data packets) of the UE to the target RAN node. After the handover finishes, the target RAN node sends the DL data forwarded from the source RAN node to the UE, and the UE starts to send UL data packets to the target RAN node if the UE has any UL data to send. The Xn interface is an interface which provides for direct communication between RAN nodes. Accordingly, embodiments allow for a source RAN node and a target RAN node via the Xn interface to implement a handover without involving the core network. This can reduce delays and reduce demands on control plane resources. The results of the handover are then communicated to the core network.

Figure 9:
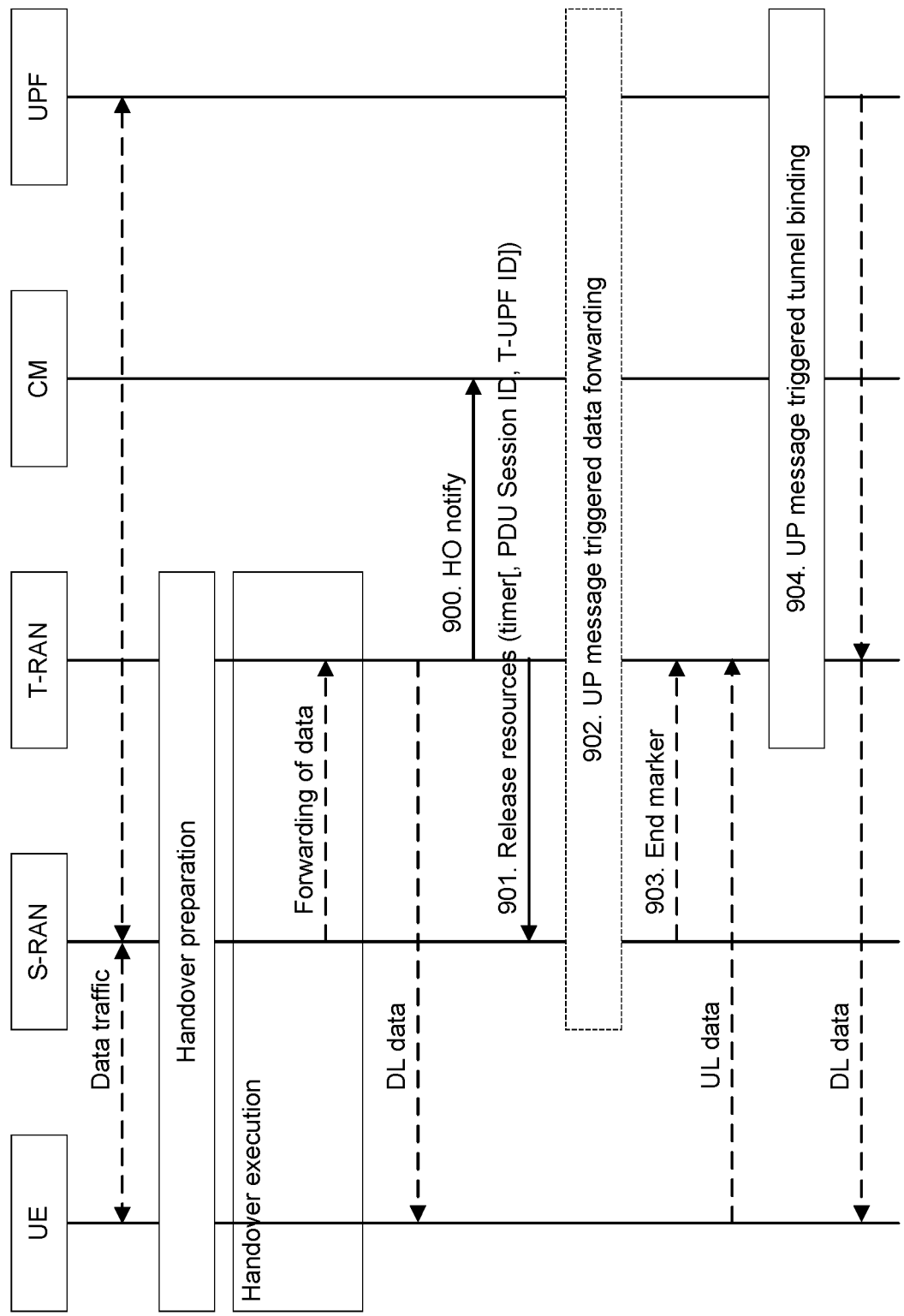
FIG. 9 is a call flow diagram illustrating a procedure of path switch in the case of Xn handover without UPF change in accordance with embodiments of the present invention.

FIG. 9 is a call flow diagram illustrating a procedure of path switch in the case of Xn (or Xn-based) handover without UPF change in accordance with embodiments of the present invention.

In this scenario, the peer UPF of the source RAN node (i.e. the source UPF) and the peer UPF of the target RAN node (i.e. the target UPF) are the same entity. Further, it is noted that the peer UPF is generically labeled as UPF as it may be the anchor UPF (which is a UPF that connects the user plane path to the DN via an N6 interface or connection) or an I-UPF connected to the anchor UPF. In this scenario, data traffic initially flows between the UE and the UPF via the source RAN node (S-RAN). In FIG. 9 the handover preparation and handover execution steps may occur in a conventional manner using the Xn interface between the S-RAN and the T-RAN. However, unlike conventional systems, the rest of the procedure proceeds with minimal involvement of the CN network functions such as the CM (which as stated above may be or include an AMF). The CM may include one or both of an AMF and an SMF as described elsewhere herein. Accordingly, the CM may additionally implement SMF functionality.

At step 900, the target RAN node sends an HO notification message which notifies the CM that the UE has been handed over to the target RAN node. The notification sent from the target RAN node to the CM may include the identifier of the UE. T-RAN node considers the handover successful after sending this message.

Accordingly, at step 901, the target RAN (T-RAN) node notifies the source RAN (S-RAN) node to release resources for the UE. The notification may include a timer value, which is to be used by the source RAN node to run a resource release timer. The source RAN node starts a resource release timer using the timer value included in the notification. The source RAN node releases resources (e.g. radio resources) allocated for the UE after the timer expires. The notification may further include information of the PDU Session ID (e.g. PDU Session ID) and/or information of the peer UPF of the target RAN node (e.g. an identifier of the peer UPF of the target RAN node, such as an identifier of the target UPF (T-UPF ID), a DNN associated to the peer UPF of the target RAN node). The target RAN node may obtain the information of its peer UPF from local configuration, which may be previously provided by a network management function (e.g. an OAM function) or by a network control function (e.g. SMF) when the network management/control function preconfigures the tunnel between the target RAN node and the peer UPF of the target RAN node as described herein in the first aspect of this disclosure. The target RAN may obtain the information of the PDU Session from the SMF, which can be a CM as illustrated here or a different entity, during establishment of the PDU Session or from another RAN node (e.g. as part of session management context or PDU Session context) during a handover procedure. In some embodiments, the target RAN node alternatively provides these information during handover preparing or execution, rather than after the target RAN node considers the handover successful, e.g. in the step 901. This alternative may happen or apply to the embodiments associated with FIGS. 10, 11. 12 as well (e.g., step 1000, step 1100, step 1200 in the figures).

At step 902, the source RAN node initiates a procedure of UP message triggered data forwarding with the peer UPF of the source RAN node. This may be in response to the release resource message 901, for example, when the target RAN node provides the information of the peer UPF of the target RAN node to the source RAN node in the step 901. The procedure of UP message triggered data forwarding is described in more detail in embodiments associated to FIG. 6. In the procedure, the source RAN node triggers data forward at the peer UPF of the source RAN node and the data forwarding target is the peer UPF of the target RAN node. In the trigger message (i.e. the UP message triggering data forwarding) sent from the source RAN node to the peer UPF of the source RAN node, the source RAN node includes the information of the peer UPF of the target RAN node as information of data forwarding target (e.g., the T-UPF ID), which is received from the target RAN node in step 901 or during handover preparation/execution. During the procedure of UP message triggered data forwarding, the peer UPF of the source RAN node sends a response to the source RAN node. In some embodiments, the response may be in the form of an end marker.

After receiving the response (e.g. when the response is in the form of an end marker) from the peer UPF of the source RAN node in step 902, the source RAN node, sends an end marker 903 to the target RAN node, indicating that it will no longer forward data of the UE to the target RAN node. The end marker may be (or be identical to) the end marker that the source RAN node received in step 902. In some embodiments, the end marker may be one that is created by the source RAN node (and thus different from the one received in step 902). The end marker allows the target RAN to perform packet reordering for the DL data of the UE, e.g. reorder DL data packets forwarded from the source RAN node and DL data packet received from the peer UPF of the target RAN node to ensure in-order packet delivery to the UE.

At step 904, the target RAN node initiates a procedure of UP message triggered tunnel binding with the peer UPF of the target RAN node for the UE, by sending a trigger message (a UP message) to the UPF. A UL data packet that the target RAN node received from the UE may piggyback on the trigger message. If the target RAN node has not received any UL data packet from the UE, the target RAN node may create a dummy UL packet for the UE and piggybacks the dummy UL packet on the trigger message. After this step, the peer UPF of the target RAN node starts to send DL data packet(s) of the UE to the target RAN node. The procedure of UP message triggered tunnel binding is described in more detail in embodiments associated with FIG. 7.

Figure 10:
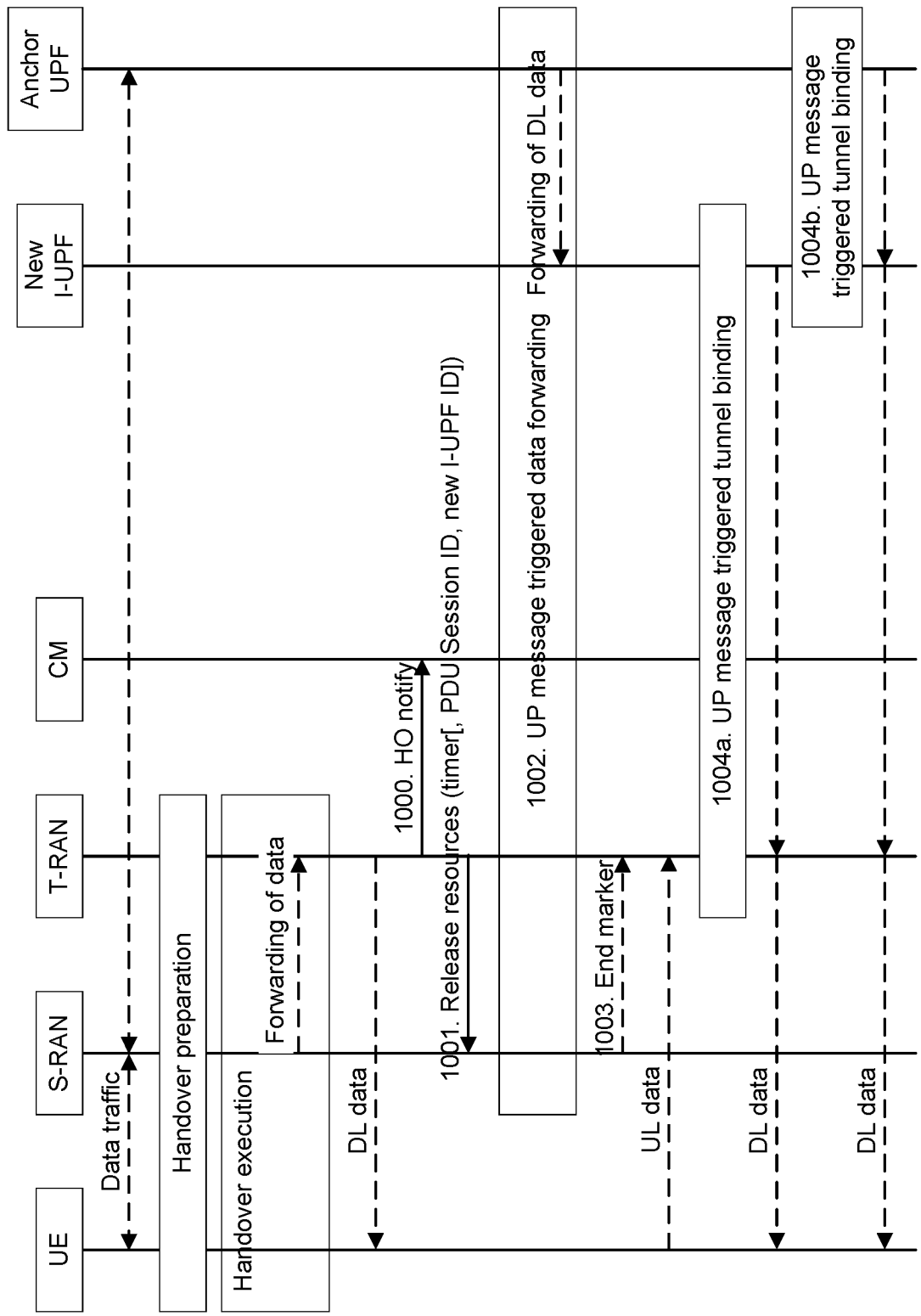
FIG. 10 is a call flow diagram illustrating a procedure of path switch in the case of Xn handover with I-UPF insertion in accordance with embodiments of the present invention.

FIG. 10 is a call flow diagram illustrating a procedure of path switch in the case of Xn (Xn-based) handover with I-UPF insertion in accordance with embodiments of the present invention. In this scenario, the peer UPF of the source RAN node (i.e. the source UPF) is an anchor UPF (i.e. a UPF that connects the user plane path to the DN via an N6 interface or connection), and the peer UPF of the target RAN node (i.e. the target UPF) is an I-UPF that is connected to the anchor UPF, which is denoted as new I-UPF in FIG. 10.

Steps 1000-1003: these steps are the same as the steps 900-903 in FIG. 9. It should be noted that the CM entity may include one or both of an AMF and SMF, as describes elsewhere herein. Accordingly, the CM may additionally implement SMF functionality.

Step 1004a. is the same or similar to the step 904 in FIG. 9. After this step, the new I-UPF starts to send DL data packet(s) of the UE to the target RAN node. At step 1004b. The I-UPF initiates a procedure of UP message based tunnel binding with the anchor UPF, by sending a trigger message (a UP message) to the anchor UPF, as described in embodiments associated with FIG. 7. The trigger message may carry the UL data packet (if any) received from the target RAN node in step 1004a. After this step, the anchor UPF starts to send DL data packet(s) of the UE to the I-UPF.

Figure 11:
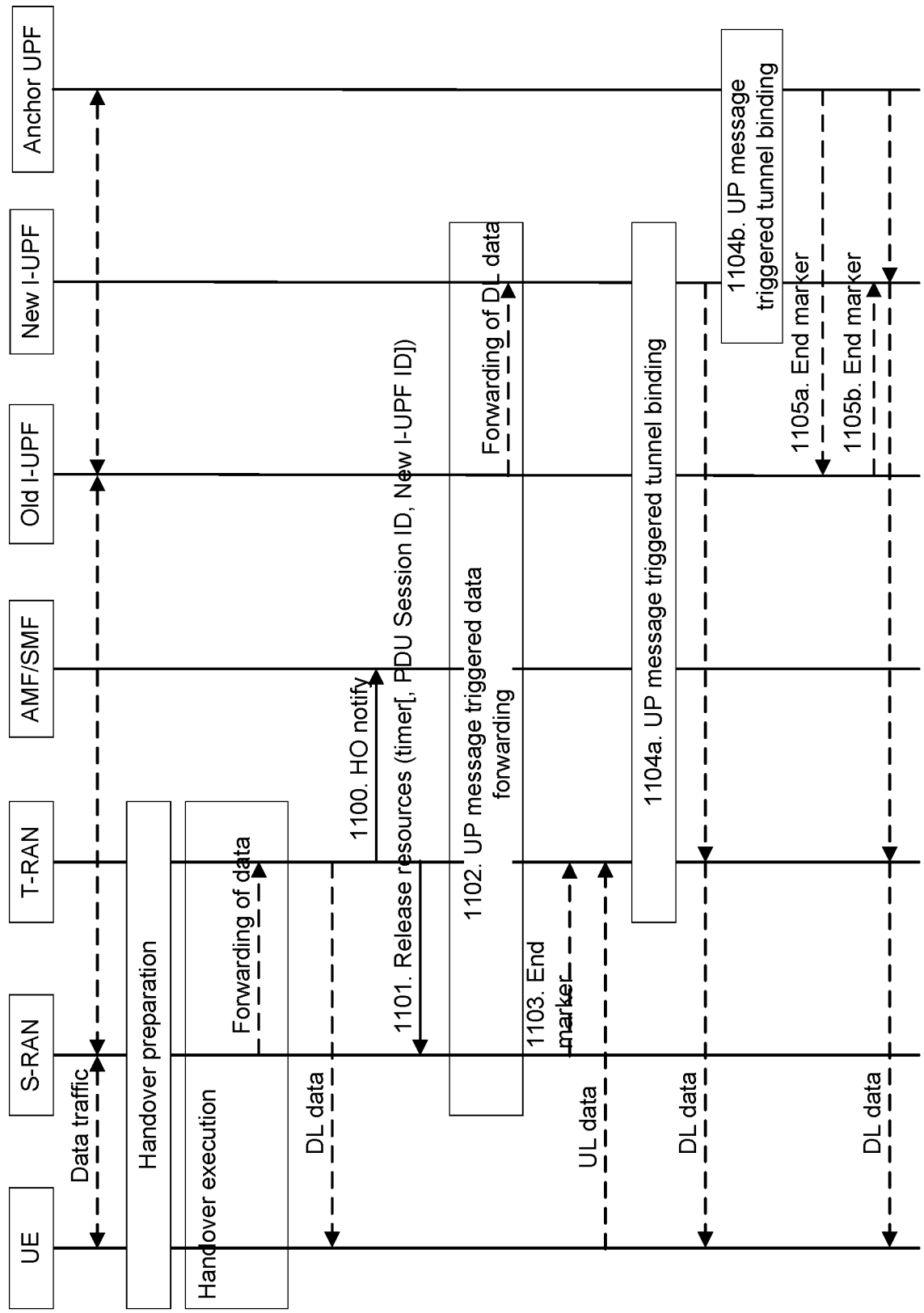
FIG. 11 is a call flow diagram illustrating a procedure of Xn handover with I-UPF relocation in accordance with embodiments of the present invention.

FIG. 11 is a call flow diagram illustrating a procedure of Xn (Xn-based) handover with I-UPF relocation in accordance with embodiments of the present invention. In this scenario, the peer UPF of the source RAN node (i.e. the source UPF) is the old I-UPF, and the peer UPF of the target RAN node (i.e. the target UPF) is the new I-UPF. The old I-UPF and the new I-UPF are different entities; they are both connected to an anchor UPF (i.e. a UPF that connects the user plane path to the DN via an N6 interface or connection). Steps 1100-1103: these steps are the similar to the corresponding steps 900-903 in FIG. 9 and steps 1000-1003 in FIG. 10. However, it is noted that the release resources message includes information (e.g. an ID) of the new I-UPF (which is the target UPF). Steps 1104a-1104b: these steps are the same as the steps 1004a-1004b in FIG. 10. It should be noted that the AMF/SMF entity may be similar to the CM entity described herein.

At step 1105a, after the tunnel binding the anchor UPF sends a message (e.g. an end marker) to the old I-UPF. The message indicates that the anchor UPF will no longer sends DL data of the UE to the old I-UPF (or that no more DL data of the UE will be sent to the old I-UPF). After receiving the message, at step 1105b, the old I-UPF sends an End marker message which may be the same message as in step 1105a or a different message (e.g. a different end marker) to the data forwarding target (i.e. the new I-UPF), indicating that it will no longer forward DL data of the UE to the new I-UPF (or that no more DL data will be forwarded to the new I-UPF). An end marker is a type of UP message as described herein. In such a UP message, the message type field (i.e. the message type field of the tunnel header) indicates that the message is an end marker.

Figure 12:
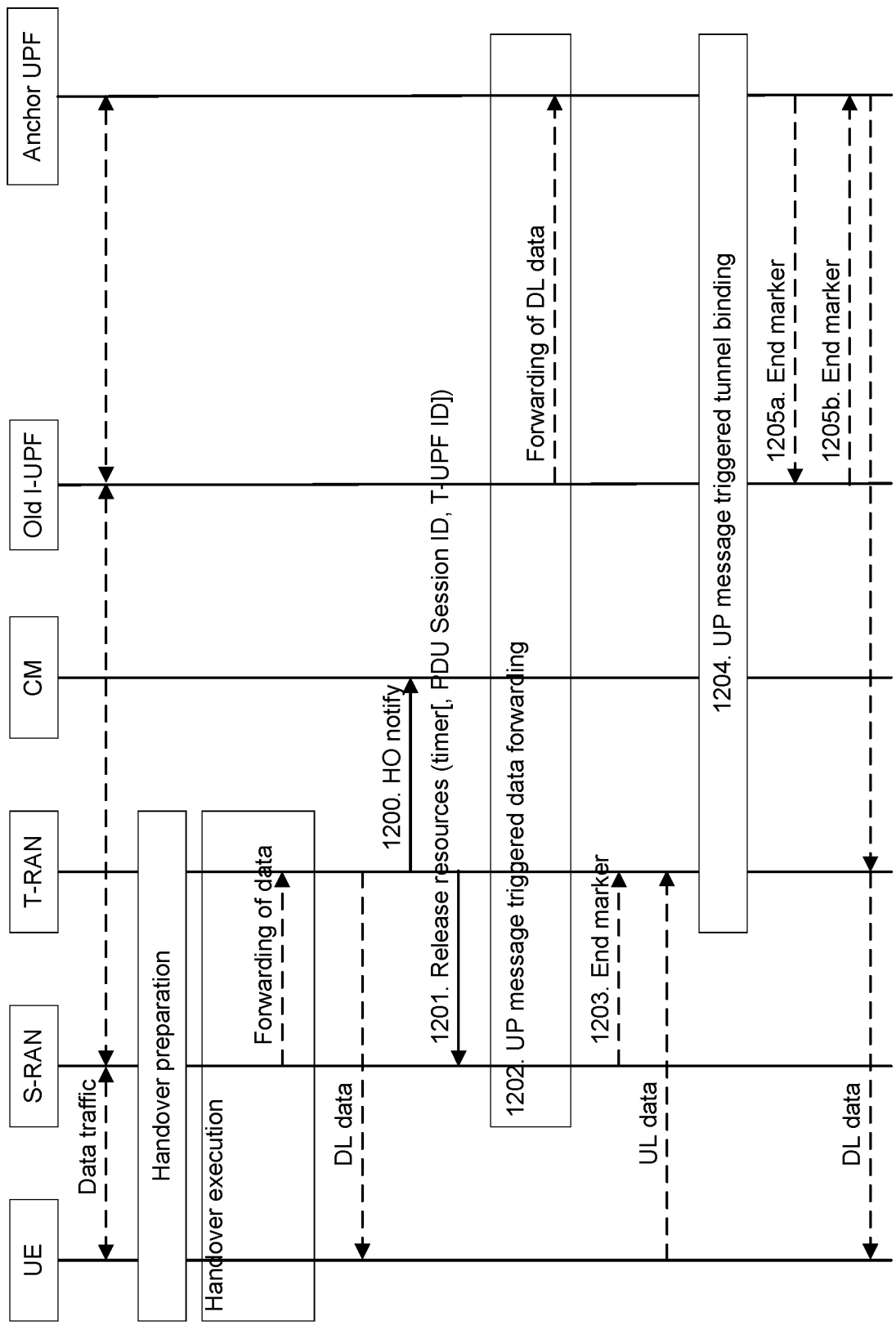
FIG. 12 is a call flow diagram illustrating a procedure of Xn handover with I-UPF removal in accordance with embodiments of the present invention.

FIG. 12 is a call flow diagram illustrating a procedure of Xn handover with I-UPF removal in accordance with embodiments of the present invention. In this scenario, the peer UPF of the source RAN node (i.e. the source UPF) is the old I-UPF that connects to an anchor UPF (i.e. a UPF that connects the user plane path to the DN via an N6 interface or connection), and the peer UPF of the target RAN node (e.g. the target UPF) is the anchor UPF. In this example procedure, the steps 1200-1203 are similar to the corresponding steps in the prior figures (i.e. steps 900-902 in FIG. 9, steps 1000-1003 in FIG. 10, steps 1100-1103 in FIG. 11) and the step 1204 is similar to the step 904 in FIG. 9. The CM entity may include an AMF, and in some embodiments may further include an SMF as described elsewhere herein. The steps 1205a and 1205b are similar to the steps 1105a and 1105b in FIG. 11, except for the following related to the step 1202 and the step 1205b. In step 1202, the source RAN node initiates a procedure of UP message triggered data forwarding with the peer UPF, which is the old I-UPF, by taking the anchor UPF as data forwarding target and by sending a trigger message (a UP message) to the peer I-UPF. Such a procedure is described in more detail in embodiments associated to FIG. 6. In the trigger message, the source RAN node includes the information of the anchor UPF as information of data forwarding target. In this step, the source UPF (labeled as Old I-UPF in the Figure) may send a response to the source RAN in the form of an end marker. The step 1205 happens from the old I-UPF to the anchor UPF, which is the data forwarding target.

In the embodiments described above for scenarios of Xn (Xn-based) handover, the information of target UPF is preconfigured in the target RAN node and provided by the target RAN node to the source RAN node via the Xn interface or connection between the source RAN node and the target RAN node after the target RAN node considers the handover successful, e.g. via the step 901 in FIG. 9, or during the handover preparation/execution before the target RAN node considers the handover successful. In the case of N2 (N2-based) handover, the Xn interface or connection is not available, and therefore, the information of target UPF can be provided by the CM to the source RAN node, e.g. when the CM notifies the source RAN node to release resource.

Figure 13:
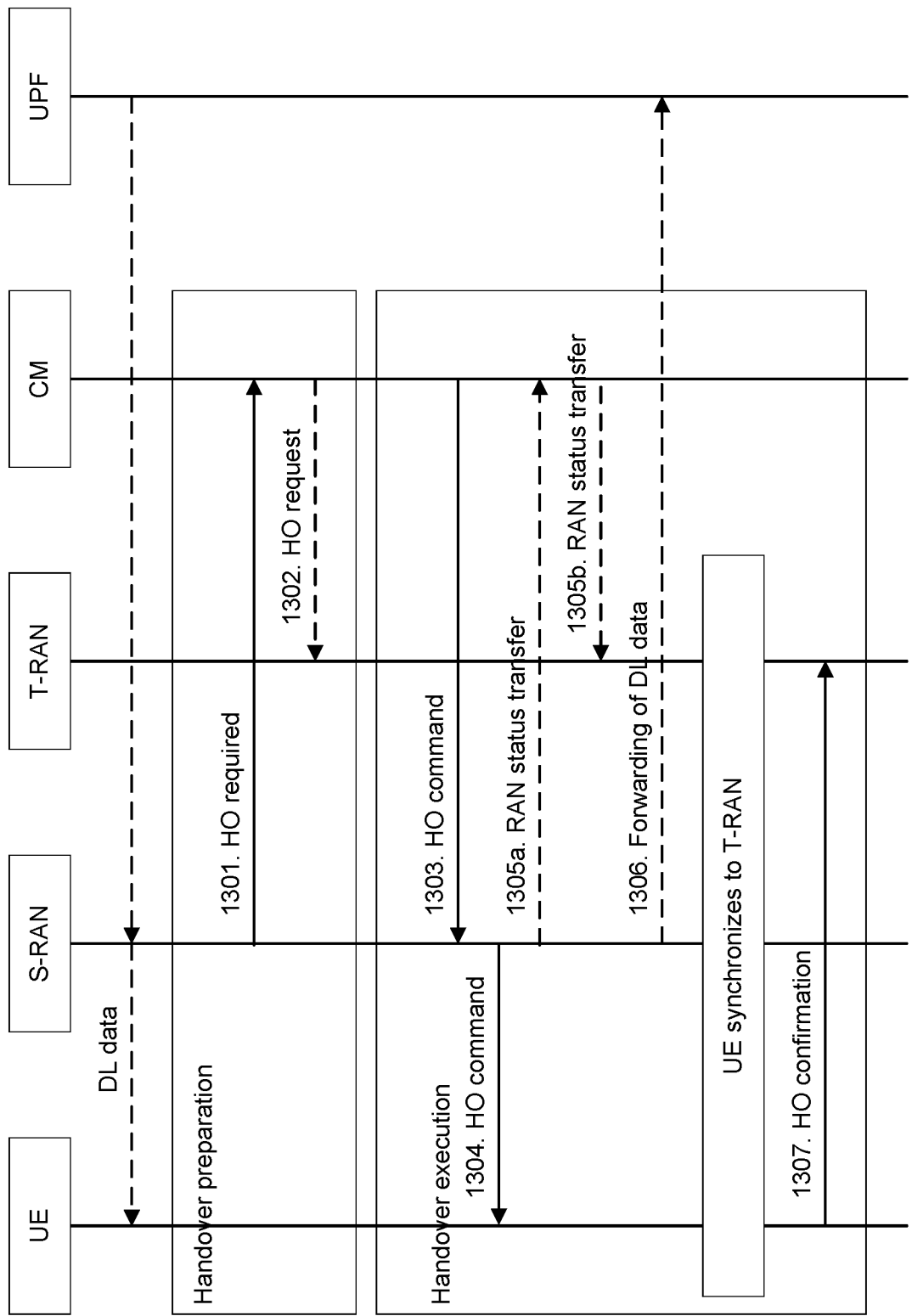
FIG. 13 is a call flow diagram illustrating a procedure of Path switch due to N2 handover without CM relocation in accordance with embodiments of the present invention.

During N2 (N2-based) handover, DL data can be forwarded to the source UPF by the source RAN node after the source RAN node receives it from the source UPF, as illustrated in FIG. 13.

FIG. 13 is a call flow diagram illustrating a procedure of N2 (N2-based) handover without CM relocation in accordance with embodiments of the present invention. It is noted that in some embodiments, the CM includes or is an AMF. The CM may also implement SMF functionality (i.e. include an SMF). Path switch associated to the handover is not shown in the figure.

At step 1301. The S_RAN node sends a message to the CM to indicate handover is required. This step is similar to the step 1 in FIG. 4.9.1.3.2-1 of 3GPP TS 23.502 V16.2.0. The message may include RAN information created by the S-RAN to be used by the T-RAN, and is transparent to the CM. At step 1302, the CM sends a handover request to the T-RAN node. This step is similar to the step 9 in FIG. 4.9.1.3.2-1 of TS 23.502 V16.2.0. The request may include the RAN information received from the S-RAN in step 1301, which is created by the S-RAN to be used by the T-RAN and is transparent to the CM. At step 1303, the CM sends a handover comment to the S-RAN node. This step is similar to the step 1 in FIG. 4.9.1.3.3-1 of TS 23.502 V16.2.0. At step 1304, the S-RAN node sends a HO commend to the UE, which includes information that is related to the UE and is sent transparently from T-RAN via the CM to S-RAN. At steps 1305*a*, 1305*b*, the S-RAN sends RAN status information to the T-RAN via the CM. At step 1306, the S-RAN starts forwarding downlink data, which it has received for the UE, to the UPF. The UPF may buffer the forwarded data until after data forwarding is triggered or tunnel binding is triggered (as described in the embodiments above). At step 1307, after the UE has successfully synchronized to the target cell, it sends a Handover Confirm message to the T-RAN. After this step, the considers the handover successful.

The path switch procedure calls are illustrated in FIGS. 14-17 for different N2 (N2-based) handover cases, where the CM may include or be an AMF. The CM may also implement SMF functionality (i.e. include an SMF). Compared to the counterparts in FIGS. 9-12 where the CM may include or be an AMF, they have the following differences with the rest being the same or similar:

The release resource step in each of FIGS. 14-17 (i.e. steps 1401, 1501, 1601, 1701) is initiated or performed by the CM rather than the target RAN node. In this step, the information (e.g. PDU Session ID) of the PDU Session and/or information (e.g. identifier, an associated DNN) of the target UPF (T-UPF), which may be a new I-UPF, is provided to the source RAN node by the CM (rather than by the target RAN node). In some embodiments, the information is preconfigured at the CM, corresponding to the scenario that CM includes SMF (i.e. the CM implements SMF functionality). In other embodiments, the CM obtains the information from the SMF (which is not shown in the figures) before the CM provides it to the source RAN node. As an alternative, information (e.g. identifier) of the target UPF can be provided to the source RAN node during the handover procedure, e.g. at step 1303 in FIG. 13. In that case, the source RAN node may initiate the UP message triggered data forwarding during the handover procedure as well (e.g. step 1306 may be integrated with the UP message triggered data forwarding procedure initiated by the source RAN node, i.e. step 1402, 1502, 1602, or 1702). Furthermore, a step corresponding to steps 903, 1003, 1103 and 1203 does not happen in the N2 handover cases.

Figure 14:
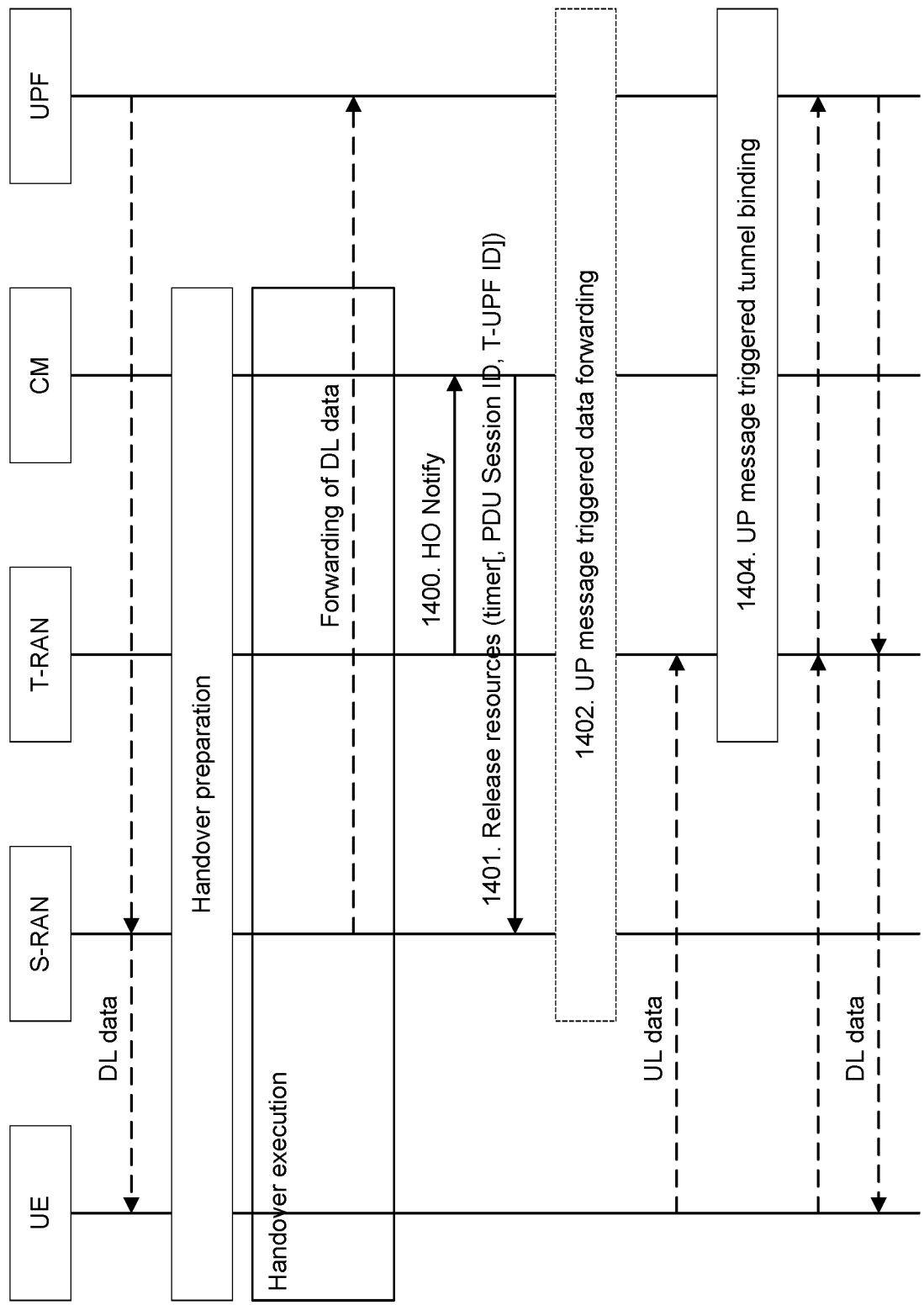
FIG. 14 is a call flow diagram illustrating a procedure of Path switch due to N2 handover without UPF change in accordance with embodiments of the present invention.

FIG. 14 is a call flow diagram illustrating a procedure of Path switch due to N2 handover without UPF change in accordance with embodiments of the present invention.

Figure 15:
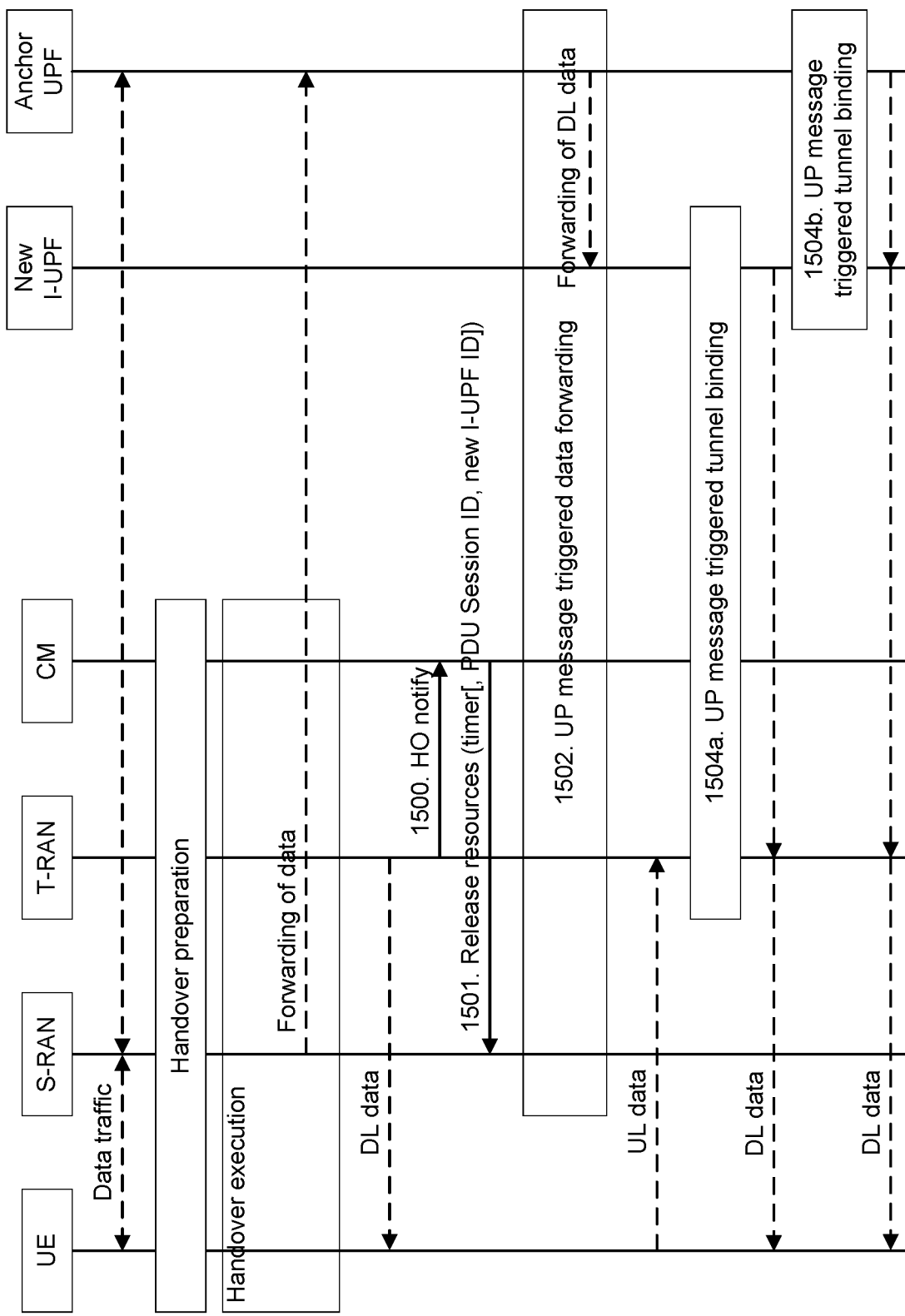
FIG. 15 is a call flow diagram illustrating a procedure of Path switch due to N2 handover with I-UPF insertion in accordance with embodiments of the present invention.

FIG. 15 is a call flow diagram illustrating a procedure of Path switch due to N2 handover with I-UPF insertion in accordance with embodiments of the present invention.

Figure 16:
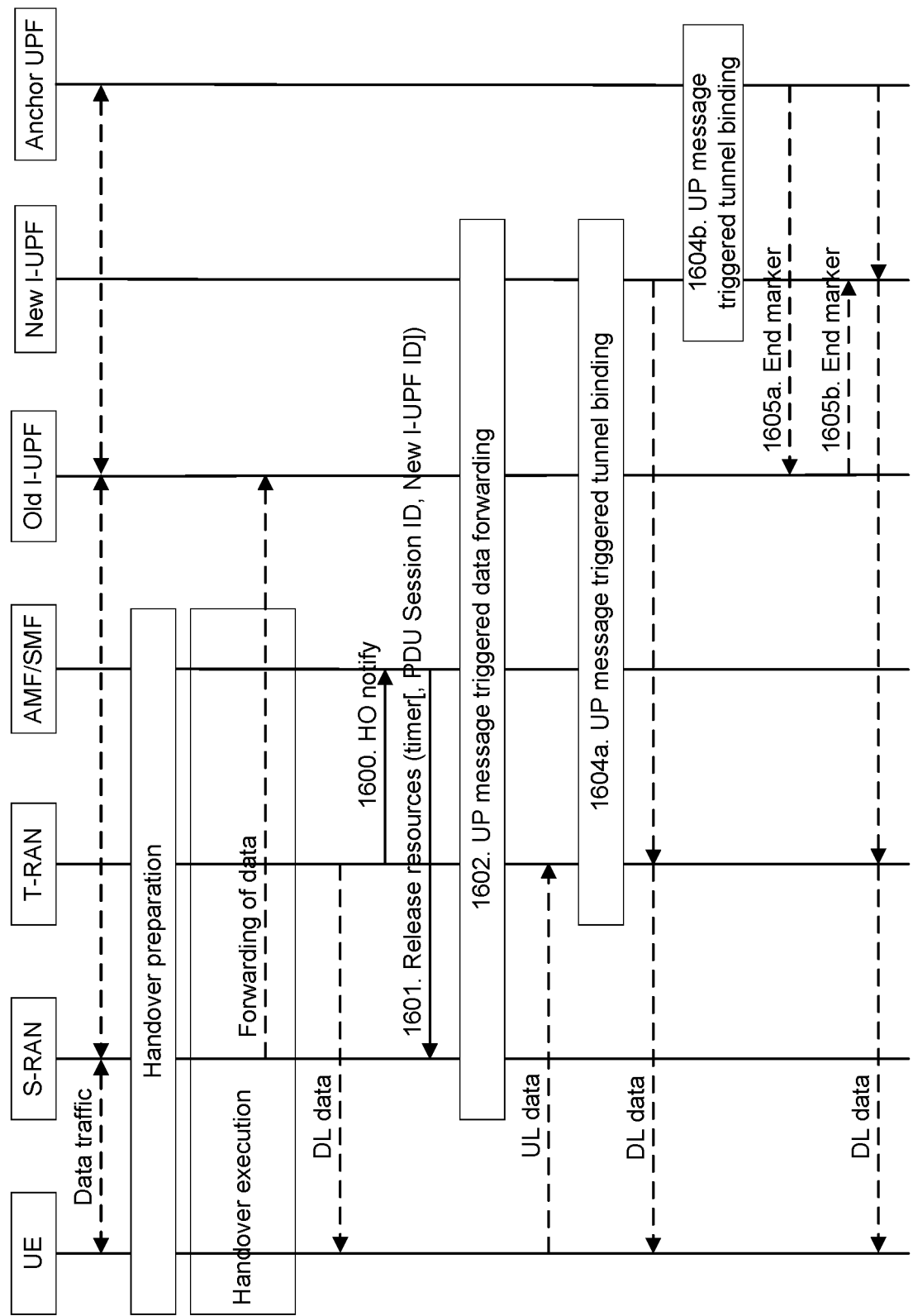
FIG. 16 is a call flow diagram illustrating a procedure of Path switch due to N2 handover with I-UPF relocation in accordance with embodiments of the present invention.

FIG. 16 is a call flow diagram illustrating a procedure of Path switch due to N2 handover with I-UPF relocation in accordance with embodiments of the present invention.

Figure 17:
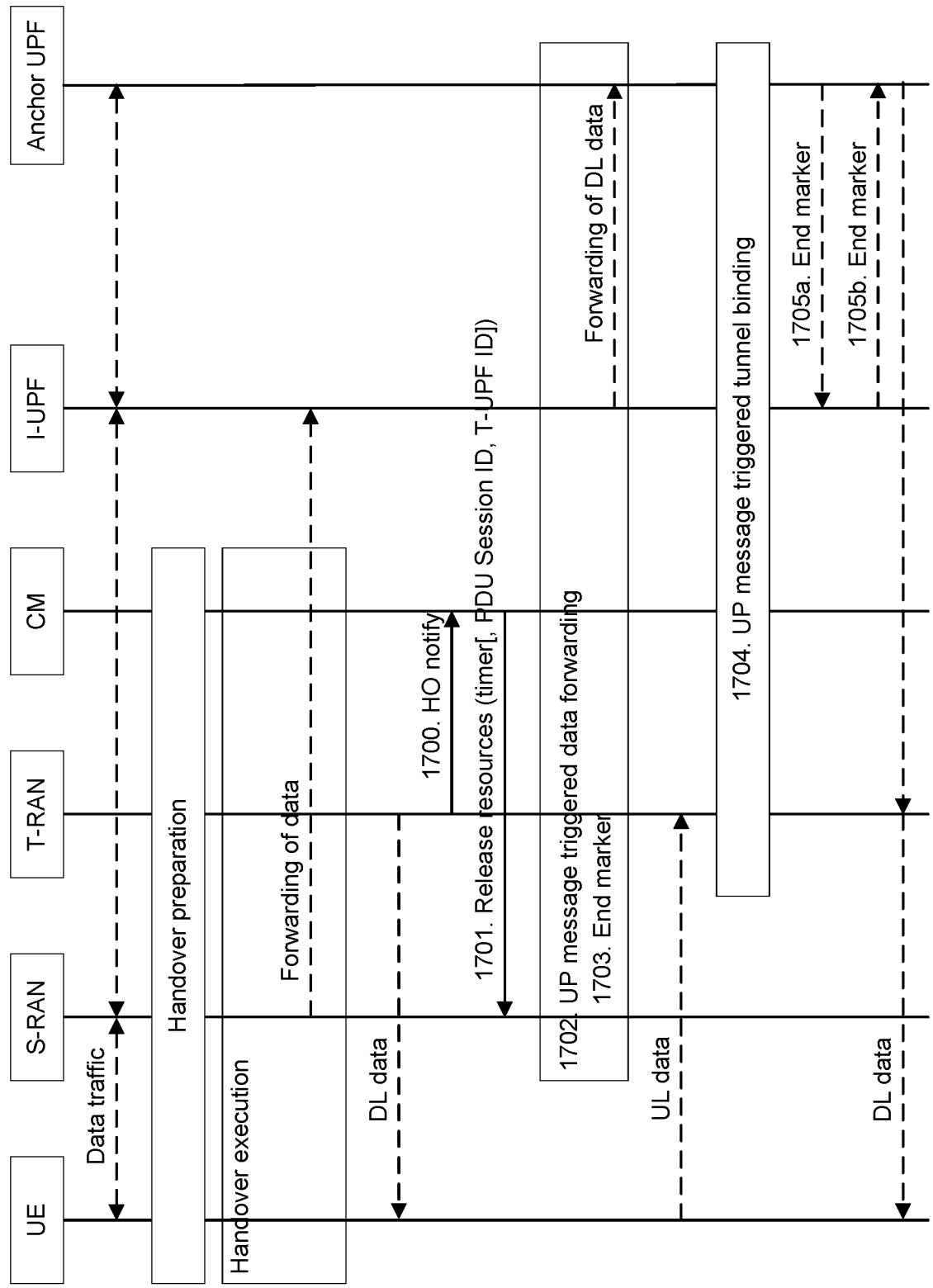
FIG. 17 is a call flow diagram illustrating a procedure of Path switch due to N2 handover with I-UPF removal in accordance with embodiments of the present invention.

FIG. 17 is a call flow diagram illustrating a procedure of Path switch due to N2 handover with I-UPF removal in accordance with embodiments of the present invention.

Accordingly, in the embodiments discussed for the first aspect, runtime control plane signalling while performing a path switch is minimized.

Embodiments related to the second aspect of this disclosure will now be discussed. As mentioned above, embodiments according to the second aspect allow a user plane (UP) entity (e.g. a RAN node or a UPF) to route a data packet received from a shared user plane connection (e.g. an N3 connection or an N9 connection), properly towards the destination. For example, such a user plane entity is a RAN node and is configured to identify a proper DRB, or the user plane entity is a UPF and is configured to identify a proper user plane connection, to use for transmitting the data packet. Advantageously, such a UP entity is configured to make such an identification without processing the data packet (e.g. reading, understandings, or analyzing the PDU header(s) of the data packet). Embodiments accomplish this by enhancing the tunnelling protocol (e.g. GTP protocol), i.e. the tunnel header (e.g. GTP header) and UP entity behavior. The tunnel header is extended to include traffic (or packet) differentiation information (TDI) to differentiate traffic within a tunnel. When a UP entity receives a data packet from a shared tunnel, the UP entity receives a tunnel packet of the shared tunnel and the data packet is included/encapsulated in or carried by the tunnel packet as payload. Accordingly, a UP entity can further route the packet using a correct tunnel by processing the TDI (selected/determined according to the TDI) in the tunnel header (i.e. the header of the tunnel packet), without needing to process the data packet in order to determine/select the correct tunnel to use, or in order to produce the correct tunnel header.

A TDI can include one or more of the following: PDU session information (e.g. a PDU Session ID) indicating the PDU Session to which the data packet belongs or is associated/related; destination information indicating the destination of the data packet (e.g. a destination ID or address, which may identify a UE or a group of UEs/a UE group); path information (e.g. a path ID) indicating the user plane path over which the data packet is being forwarded or routed along.

A data packet being carried by or included/encapsulated in a tunnel packet as payload is referred to as a tunnelled data packet. The tunnel header of such a tunnelled data packet (or data packet for short) is the header of the tunnel packet.

An example will be discussed with reference to FIG. 3. When UPF 1 receives a tunnelled DL data packet (targeting the UE 1) from the N9 tunnel, the UPF can use the TDI, and possibly other information, e.g. TEID, QFI, in the tunnel header (of the tunnelled DL data packet) to select/identify a corresponding N3 tunnel. Accordingly, UPF 1 can select the correct N3 tunnel (e.g., N3 connection 1) to use for transmitting the data packet toward the UE. UPF 1 is configured to map the N9 connection to the N3 connection 1. Accordingly, the UPF 1 then transmits the data packet using the selected/identified N3 tunnel to RAN 1, i.e. produces an outbound (DL) tunnel packet with a tunnel header including an appropriate TDI and the data packet as payload and sends the tunnel packet to RAN 1. The RAN 1 receives the data packet from the N3 connection 1 (which is potentially shared by multiple PDU Sessions) and further routes the data packet using a selected DRB (e.g. DRB 1) to the UE, and the DRB is selected according to the TDI in the tunnel header. As the DL data packet is transmitted/forwarded/routed along the user plane path (i.e. through the N3 tunnel and the N9 tunnel) toward the UE (UE 1), the tunnel header of the DL data packet may change (e.g. the TEID in the tunnel header changes as the tunnel changes), but the TDI in the tunnel header may remain the same or unchanged.

Embodiments will be discussed using GTP tunnels (in particular GTPv1-U tunnel) as example. However, the inventive concepts can be applied to other type of user plane tunnels. It is noted that the terms GTP tunnel and tunnel are used interchangeably, and the terms GTP header and tunnel header are used interchangeably.

Figure 18A:
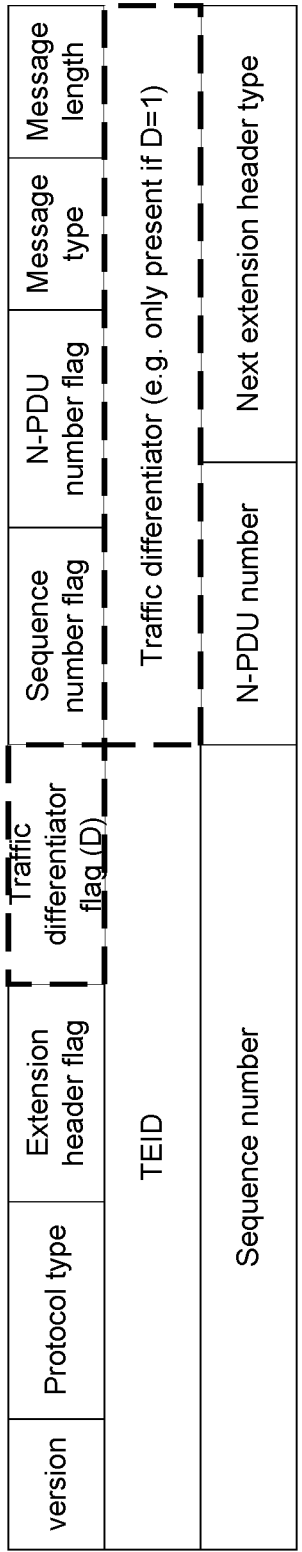
FIG. 18A illustrates a GTP protocol header extended to include traffic differentiation information (TDI), in accordance with embodiments of the present invention.
Figure 18B:
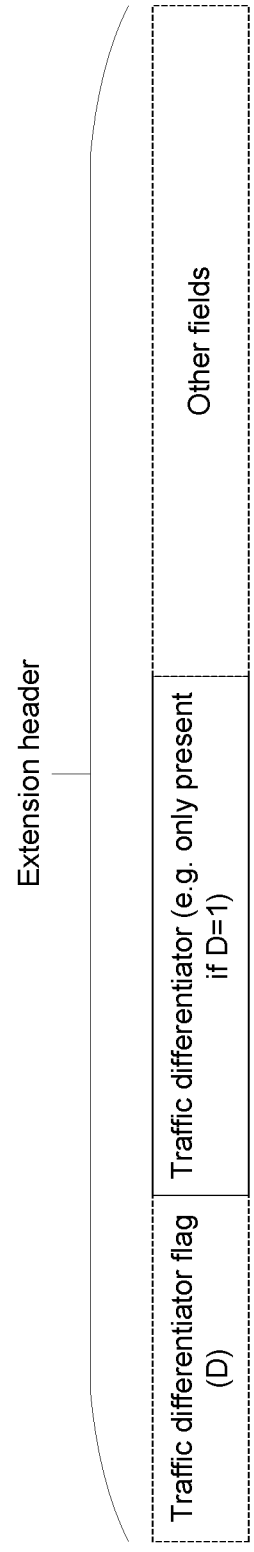
FIG. 18B illustrates a TDI in an extension header, in accordance with embodiments of the present invention.

FIG. 18A illustrates a GTP protocol header extended to include traffic differentiation information (TDI), in accordance with embodiments of the present invention. FIG. 18B illustrates an alternative with the TDI in an extension header, in accordance with embodiments of the present invention. The TDI can be used to differentiate traffic transported through a GTP tunnel. For example, a TDI may be included in the main or regular GTP header, as shown in FIG. 18A. As an alternative, the TDI can be included in an extension header, such as a GTP extension header, as shown in FIG. 18B (e.g. the TDI can be included in the PDU Session Container Extension header that contains QFI). For the remaining discussion, examples will simply refer to a TDI being in the GTP header, without differentiating between the examples shown in FIGS. 18A and 18B, where the traffic differentiator field includes the TDI.

In some embodiments, the traffic differentiator field is a mandatory field. In other words, even if there is no TDI information, the TDI in the traffic differentiator field may include a special value or code (composed of a particular or special sequence of 1s and/or 0s) to imply traffic differentiation is not needed or not supported in the tunnel header. In other embodiments, the traffic differentiator field is an optional field, and the GTP header may include a separate traffic differentiator flag (D) field to include information or value indicating whether the traffic differentiator field exists in the GTP header. For example, when the value of the traffic differentiator flag field is set to 1, it implies the traffic differentiator field exists, and when the value of the traffic differentiator flag field is set to 0, it implies the traffic differentiator field does not exist. The traffic differentiator flag (D) field and the traffic differentiator field may be present in the same header, e.g. either in the main/regular GTP header or in an GTP extension header, as shown in the FIGS. 18A and 18B. When the traffic differentiator field does not exist in the GTP header as indicated by the traffic differentiator flag (D) field, the GTP header therefore does not contain a TDI, and this may imply that traffic differentiation is not needed or supported in the tunnel header.

The TDI in the GTP header (e.g. in the traffic differentiator field of the main/regular GTP header or of an GTP extension header) is used (by a user plane (UP) entity, e.g. UPF, RAN node) to differentiate the tunnelled data packets without processing the data packets. The TDI may include one or more of the following: destination information (e.g. a destination ID or address); path information (e.g. a path ID); and PDU Session information (e.g. a PDU Session ID). These fields respectively indicate or identify the destination of the tunnelled data packet (which may be a UE or a group of UEs); the path that the tunnelled data packet is being forwarded/routed along; and the PDU Session to which the tunnelled data packet belongs or is related; wherein the tunnelled data packet being the data packet carried by the GTP packet. When traffic differentiation is not needed or supported within the tunnel header, the TDI in the GTP header may include a special value or code (composed of a particular or special sequence of 1s and/or 0s). In that case, a user plane entity may process the data packets to differentiate the tunnelled data packets.

For example, when a tunnelled data packet is a DL packet for a UE, the TDI may include information (e.g. an ID such as SUPI (subscription permanent identifier), or a network address) identifying the UE or the UE group. When the tunnel is used to transport data packets of multiple UEs or UE groups, GTP packets carrying the different UEs' or UE groups' data packets are differentiable by their GTP header as the TDI in the headers is different. In other words, the TDI identifies the different UEs or UE groups. It is noted the TEID (Tunnel Endpoint Identifier) in the headers can be the same.

In another example, when the tunnelled data packet is a DL packet being forwarded along a user plane path, the TDI may include information (e.g. an identifier) identifying the user plane path. In some embodiments, a tunnel between two user plane entities can be shared by multiple (end-to-end) user plane paths. When the tunnel is shared by multiple user plane paths, GTP packets carrying data packets being forwarded or routed along the multiple user plane paths are differentiable by their GTP header. In such an example, the TDI in the headers is different for each user plane path and the TDI identifies the different user plane paths. In a third example, when the tunnelled data packet is a DL packet related (or belonging) to a PDU Session, the TDI may include information (e.g. an identifier) identifying the PDU Session. When the tunnel is shared by multiple PDU Sessions (as part of their user plane paths), GTP packets carrying data packets related (belonging) to the multiple PDU Sessions are differentiable by their GTP header, as the TDI in the headers is different and identifies the different PDU Sessions.

Figure 19:
FIG. 19 illustrates an example of a network function configuring a user plane entity with packet handling rules, in accordance with embodiments of the invention.

Examples of packet handling rules implemented by user plane entities will now be discussed. FIG. 19 illustrates an example of a network function configuring a user plane entity with packet handling rules, in accordance with embodiments of the invention. As illustrated, a network function (e.g. SMF) provides or updates or configures the UP entity (e.g., UPF 1, RAN 1) with packet handling rules or instructions (which are known as UP handling rules). This can be performed, for example, by sending a message including the packet handling rules or instructions to the UP entity.

Referring to FIG. 3. multiple UEs (i.e. UE 1, UE 2) are connected to or served by the RAN node RAN 1. One or multiple DRBs are established for each of the UEs with the RAN 1, e.g. DRBs 1 and 2 for UE 1 and DRB 3 for UE 2. A GTP tunnel, e.g. N3 tunnel 1, is established between the RAN 1 and the UPF 1. The packet handling rules or instructions inform the UP entities (e.g. RAN 1 and UPF1) which tunnel to use (e.g., DRB 1 or DRB 2) and how to assemble the GTP header.

The packet handling rules or instructions may be provided by the network function to the RAN 1 or alternatively the packet handling rules or instructions may be configured, by the network function, respectively into the RAN 1. The packet handling rules or instructions may include the following information: information of the N3 tunnel 1 (e.g. TEID), QoS flow information (e.g. QFI), the TDI to be used by the RAN 1 for differentiating DL data packets received from the N3 tunnel 1. The RAN 1 may allocate DRBs and corresponds the DRBs to any combination of the information (e.g. TEID+QFI+TDI). Then the RAN can, based on these information including the TDI, identify DRBs for the DL data packets with matching information (e.g. TEID, QFI, TDI) in the tunnel header. For UL data packets received from one of the DRBs, the RAN 1 can include the TDI in the tunnel header when transmitting/sending the data packet using the N3 tunnel 1 in the UL direction.

The packet handling rules or instructions provided by the network function to the UP entity configure the UP entity and may include a packet detection rule (PDR) and a forwarding action rule (FAR). The network function may provide or update the packet detection rule and the forwarding action rule to or configure them into the UPF together, e.g. via a single message, or separately, e.g. via different messages. The network function may provide or update or configure the UPF with the packet handling rules or instructions related to a PDU session during establishment of a PDU Session and/or during modification of the PDU Session. In some embodiments, the network function does so at network slice level when configuring or updating the configuration of a user plane of the network slice, and the packet handling rules or instructions being related to a network slice.

The PDR contains information used to classify a packet arriving at the UPF in a certain transmission direction, e.g. UL direction or DL direction. An example PDR is illustrated in FIGS. 20A-C.

FIGS. 20A-C illustrate an example structure of a packet detection rule according to an embodiment of the present invention. The PDR includes information (e.g. UE IP address, tunnel information, QoS flow ID, packet filter(s), application ID, Ethernet PDU Session info, etc.) for detecting traffic, and is associated with or related to the FAR, e.g. by including a FAR ID. The association/relation implies traffic/packets matching the PDR (or detected using the information in the PDR) should be routed or forwarded according to the associated FAR. As illustrated in FIGS. 20A-C, the PDR may include TDI for detecting traffic as well. The TDI may be included in a TDI field (or as a TDI attribute). The UE (or UE group) IP address field (or attribute) may be optional as the UE IP address or UE group IP address can be included in the TDI.

The FAR indicates how a packet shall be buffered, dropped or forwarded, including packet encapsulation/decapsulation and forwarding destination. The FAR may include information (referred to as traffic differentiation indicator) indicating whether to include TDI (described above) or not in the tunnel header when forwarding the traffic, as illustrated in FIGS. 21A-C, when transmitting the packet using a tunnel, e.g. a N3 tunnel or a N9 tunnel. In some embodiment, the traffic differentiation indicator may further include or be associated with information (in this case, the associated information is also included in the FAR) indicating what type of information (e.g. destination ID/address, path ID, PDU Session ID) to be used as traffic differentiation information (TDI). In some embodiments, this information is preconfigured in the UPF or separately (from the traffic differentiator) managed in the UPF and if so, need not be included in or associated with the traffic differentiation indicator.

FIGS. 21A-C illustrate an example structure of FAR, according to an embodiment of the present invention. Referring to FIGS. 21A-C, the traffic differentiator and the traffic differentiation (TDI) may both be included in (or form part of) the information in the 'Outer header creation' field or attribute. In some embodiments, the TDI may be included in a different field or attribute. The information associated with the traffic differentiator as described above, if any, may be included in the same field or attribute as the traffic differentiator or in a separate field or attribute.

In some embodiments, the traffic differentiation indicator (and the associated information, e.g. information indicating what of information to be used as TDI, if any) is not included in the FAR. In such embodiments, this information may be sent in a separate traffic differentiation rule or instruction provided/updated to or configured into the UPF by the network function. The traffic differentiation rule or instruction can be sent to the UPF when the network function provides or updates or configures the UPF with the packet handling rules or instructions, as described above. In this case, the traffic differentiation rule or instruction may be associated to the PDR or the FAR (e.g. the PDR or FAR may include a reference ID of the traffic differentiation rule or instruction) and applied together with the FAR by the UPF to data packets matching the PDR.

In some embodiments, some UP handling rules described above include or are associated with traffic detection information (e.g. packet filter, packet flow description (PDF)). The traffic detection information are used by the UPF to detect traffic that the UP handlings should apply to. The traffic detection information may be related to specific UEs' or UE group's traffic and contain information, which describes the traffic, e.g. the characteristics/properties of a data packet of the UE or UE group (for example, containing a network address of the UE or the UE group, such as an IP address or an Ethernet address, as source address or destination address in the PDU header). However, in some embodiments, the traffic detection information does not include such information or sufficient such information (e.g. missing the network address of the UE or the UE group), for example, when such information is available or fully available when being provisioned or configured to the UPF. Instead, the traffic detection information may include or use some information (e.g. UE ID, UE group ID, PDU session ID) that normally appears in control plane signals to describe the traffic. In that case, the traffic detection information cannot be directly used to detect traffic, and the UP handling rules may not be applicable or functional. When UP message triggered tunnel binding is used to establish user plane path (e.g. as illustrated in FIG. 8, step 808) or to perform path switch as described in the first aspect of this invention (e.g. with respect to embodiments associated with FIG. 7), the UP message that triggers tunnel binding at the UPF may also trigger activation of UP handling rule at the UPF. The UP message triggered tunnel binding is described in more detail with respect to embodiments associated with FIG. 7. The UP message triggered tunnel binding may be initiated by a UP entity that may be a RAN node or another UPF, that is, the UP message may be sent from that UP entity. The UP message may include information such as UE ID, UE group ID, PDU Session ID, and/or a network address of the UE or the UE group. The UP entity may obtain the information from a network management or control function such as SMF, during establishment (e.g. step 807 in FIG. 8, included in the N2 message sent from the SMF to the RAN node when the UP entity is a RAN node) or modification of the PDU Session. In some embodiments, when the UP entity sends the UP message to trigger tunnel binding at the UPF, part of the information (such as the network address of the UE or UE group) may be included in a data packet carried/included in the UP message rather than the UP message itself (e.g. the part of the information is included in the PDU header (e.g. as source address) of the data packet that piggybacks on the UP message. The UPF upon receiving the UP message may identify the UP handling rule related to the information, for example, by checking whether the traffic detection information in or associated to the UP handling rules includes matching information or matches the information. When activating UP handling rules, the UPF combines the traffic detection information (included in or associated to the UP handling rules) and the information (e.g. network address of the UE or the UE group) received in the UP message as applicable traffic detection information. The applicable traffic detection information can be directly used to detect traffic that is subject to the UP handling rules (i.e. traffic that the UP handling rules should be applied to), and therefore the UP handling rules becomes activated. After the UP handling rules are activated, the UPF uses the applicable traffic detection information to detect traffic that is subject to the UP handling rules. In other words, the UPF can combine a UP handling rule with missing information which the UPF receives (as part of the UP message during UP message triggered tunnel binding) in order to apply the UP handling rule to user plane traffic.

The UPF associates the activated UP handling rules to the tunnel (referred to as tunnel 1) from which the UP message is received and/or to the tunnel (referred to as tunnel 2) to which the tunnel binding is related. When the UPF receives traffic from tunnel 1 or sends traffic to tunnel 2, the UPF applies the UP handling rules to the traffic and processes the traffic according to the rules. Tunnel 1 and tunnel 2 may be the same tunnel and may be a shared tunnel (e.g. shared by multiple PDU Sessions or UEs). When processing the traffic according to the UP handling rules, the UPF may use the information (such as UE ID, UE group ID, PDU Session ID, and/or a network address of the UE or UE group) in the UP message as TDI to support traffic differentiation within tunnel 1 and tunnel 2, as described above with respect to the second aspect of this disclosure. The procedure of UP message triggered tunnel binding is described in more detail above with respect to embodiments associated with FIG. 7.

The UPF applies the PDR on user plane traffic to identify or detect matching traffic (i.e. matching the traffic filter in the PDR) and route or forward the traffic according to the FAR (and the traffic differentiation rule described above, if any) associated/related to the PDR (e.g. perform buffering, dropping or forwarding, packet encapsulation/decapsulation) as indicated in the forwarding action rule (and according to the traffic differentiation rule, if any).

User plane handling according to embodiments will now be discussed, with reference to the example of a UPF. In this example, the UPF receives a data packet from a user plane tunnel, called a reception tunnel. If the data packet is to be sent in a direction (UL direction or DL direction) using a tunnel (e.g. N3 tunnel, or N9 tunnel), which is called transmission tunnel here for simplicity, the UPF generates a GTP packet for the tunnel. The GTP packet contains the data packet as payload and a GPT header (i.e. transmission tunnel header) that is generated using the parameters (e.g. TEID) related to the transmission tunnel and according to the size of the data packet. In particular, the UPF includes the TEID identifying the transmission tunnel into the TEID field of the transmission tunnel header. The UPF may include the TDI corresponding to the data packet in the transmission tunnel header. The UPF may obtain the TDI from the tunnel header (reception tunnel header) when receiving the data packet from the reception tunnel if the TDI is included in the reception tunnel header. In some embodiments, the UPF may identify the TDI by analyzing the PDU header of the data packet. For example, the UPF may identify the TDI by identifying the identifier of the UE or UE group, the Path, or the PDU Session corresponding to the destination address or source address in the PDU header of the data packet. The UPF then transmits the generated GTP packet using the transmission tunnel.

In some embodiments, if the UPF analyzes or processes the data packet by matching it to a PDR (e.g. in the case the data packet is received from an N6 interface, or if the UPF is acting as UL CL or BP), the FAR or the traffic differentiation rule associated to the PDR that the data packet matches may indicate the transmission tunnel and related parameters (e.g. by the 'outer header creation' field/attribute as illustrated in FIGS. 21A-C). The UPF thus can identify the transmission tunnel and obtain related parameters from the FAR (e.g. the 'outer header creation' field/attribute of the FAR) or the traffic differentiation rule. If the FAR or the traffic differentiation rule include traffic differentiation indicator, when transmitting/sending the data packet using the transmission tunnel, the UPF may include in the transmission tunnel header the TDI that is included in or associated to the traffic differentiation indicator. In some embodiments, the TDI is included in the PDR (e.g. as illustrated in FIGS. 21A-C), and the UPF obtains the TDI from the PDR and includes it in the transmission tunnel header as indicated by the traffic differentiation indicator.

In some embodiments, the UPF may not analyze or process the data packet, for example, when the data packet is received from a N3 tunnel or an N9 tunnel and the UPF is not acting as a UL CL (uplink classifier) or BP (branching point). The user plane tunnel that the data packet is received from is called reception tunnel here for simplicity. In this case, the UPF may identify the transmission tunnel based on the mapping relation between the transmission tunnel and the reception tunnel. The mapping relation may be pre-configured by a network function, and the network function may be the same network function that provides packet handling rules or instructions to UPFs as illustrated in FIG. 19. When identifying the transmission tunnel, the UPF may take into account or use the TEID and/or FQI and/or TDI (if exists) in the reception tunnel header. If the reception tunnel header includes TDI, when transmitting/sending the data packet using the transmission tunnel, the UPF may include it in the transmission tunnel header.

After the RAN node receives a data packet from a user plane tunnel (e.g. an N3 tunnel), the RAN node can retrieve TDI, the TEID and FQI from the GTP header (i.e. tunnel header). The RAN node then identifies the DRB corresponding to the TDI, the TEID and the FQI. The RAN node then sends the data packet to the UE using the DRB. If the GTP header does not includes the TDI or if the TDI indicates traffic differentiation is not needed or supported, the RAN node may identify the DRB only using the TEID and the FQI, in which case the RAN node uses the identified DRB to send the data packet. Otherwise, the RAN node will have to analyze or process the data packet (e.g. checking the PDU header of the data packet, e.g. the destination address field of the PDU header) to determine the DRB to use.

For a UPF (e.g. the PSA UPF or a UL CL UPF or BP UPF) along the user plane path of a PDU Session, the SMF establishes an N4 Session with the UPF and provide parameters (or rules) including N4 Session ID, PDRs, FARs, URRs (usage reporting rules), QERs (QoS enforcement rules), MARs (multi-access rules), trace requirements to the UPF. These parameters (rules) are used by the UPF when processing data packets received in the user plane, e.g. from user plane tunnels such as N3/9 tunnels or from an N6 interface connecting to the DN. The N4 Session is associated or mapped to the PDU Session. The UPF informs or notifies (e.g. by sending a message or a notification to the SMF) the SMF about events related to the PDU Session that are detected by the UPF using the N4 Session ID (e.g. by including the N4 Session ID in the notification sent to the SMF). The SMF can then identify the corresponding PDU Session that the event is related to.

When the user plane tunnels are not dedicated to the PDU Session, the N4 Session may not be corresponding uniquely to the PDU Session. In that case, the UPF may include TDI (e.g. UE ID, UE group ID, path ID or PDU Session ID) in the notification when reporting to the SMF. The TDI can be identified by the UPF, e.g. from the PDR, from the traffic differentiation rule, or according to PDU header of the data packets, as described above.

Advantageously, some embodiments enable traffic differentiation among tunnelled packets related to different UEs, or paths, or PDU Sessions when the tunnel is shared by multiple UEs/UE groups, paths or PDU Sessions. Tunnel sharing reduces tunnel configuration signals and thus reduces network management overhead, and also reduces size of tunnel lookup table at user plane entities, e.g. UPF and RAN node.

In some embodiments, the preconfigured connection/tunnel (e.g. between RAN node and UPF) can be at per PDU Session granularity or at per slice granularity or at per DNN (or DN) granularity, or any of their combination.

Embodiments described herein may be applied in in a private setting, e.g. a factory, a campus, etc. Further, in embodiments described herein, UE can include vehicles, robots, drones, IoT devices (e.g., sensors, actuators), wearable devices (e.g. smart watch, smart glass), phones, and tablets.

Further, in embodiments described herein, the RAN node may include a satellite, e.g. a geo-stationary satellite, or a LEO (Low Earth Orbit) satellite.

Embodiments described herein simplify UP path management and improve system runtime performance, for example, improvement delay/latency performance. The embodiments described herein further allow reduction in capital and operating (CA/OPEX) costs.

An aspect of the disclosure provides a method of user plane handling. Such a method includes sending, by a first user plane entity, to a second user plane entity, a trigger message for changing the user plane handling for a protocol data unit (PDU) session. In some embodiments, the trigger message includes information about the PDU Session and indicates an action to be triggered. In some embodiments, the trigger message originates with the first user plane entity and not with a control plane entity. In some embodiments, the action to be triggered is a data forwarding and the trigger message includes information about the target of the data forwarding. In some embodiments, the action to be triggered is a tunnel binding. In some embodiments, the first user plane entity is a radio access network node and the second user plane entity is a user plane function (UPF). In some embodiments, the first user plane entity is a user plane function (UPF) and the second user plane entity is a different user plane function (UPF). In some embodiments, the target of the data forwarding is a peer UPF of a radio access node, and the radio access node being different from the first user plane entity, and the target of the data forwarding being different from the peer UPF. In some embodiments, the radio access node sends a trigger message to the peer UPF of the radio access node to trigger tunnel binding, the radio access node being a target RAN node and the first user plane entity being a source RAN node during a handover. In some embodiments, the data forwarding and the tunnel binding are to implement path switch caused by the handover. In some embodiments, the trigger message is in the form of a GTP message and triggers at least of one of: a path switch; and a data forwarding. In some embodiments, the first user plane entity is a source RAN node sending a trigger message about data forwarding in the user plane. In some embodiments, the first user plane entity is a target RAN node sending a trigger message about a tunnel binding in the user plane. In some embodiments, the tunnel binding is to implement a path switch. In some embodiments, a target RAN node identifies the target of the data forwarding to a source RAN node. In some embodiments, the target of the data forwarding is identified to the first user plane entity in a message received from the radio access node. In some embodiments, the target of the data forwarding is identified to the first user plane entity in a message received from a control plane entity. In some embodiments, the control plane entity is an Access and Mobility Management Function (AMF). In some embodiments, the AMF receives information identifying the target of the data forwarding from an SMF and includes the information in the message sent to the first user plane entity.

Another aspect of the disclosure provides a network element implementing control plane function for pre-configuring the user plane entities with path handling rules such that the UP entities can perform the methods described herein.

Another aspect of the disclosure provides a network element implementing a user plane function for performing the methods described herein.

Another aspect of the disclosure provides a method of using a shared tunnel. Such a method includes receiving from a reception tunnel by a first user plane entity a tunnel packet including a tunnel header and a data packet. Such a method further includes routing, by the first user plane entity to a second tunnel using information in the tunnel header without processing the data packet.

Another aspect of the disclosure provides a network node configured as a control plane function. Such a network node includes a processor coupled to non-transient machine readable memory for configuring the network node for: configuring a user plane entity to use traffic differentiation information in a received tunnel header to route a data packet without analyzing the data packet.

It should be appreciated that while examples have been given directed to specific methods, aspects of the inventions are directed to apparatus and systems for executing these methods. Further aspects of the invention are directed to network functions implemented within apparatus for implementing the method described and claimed herein.

For example an aspect of the invention provides a network node including a processor, and non-transitory machine readable memory storing machine executable instructions, which when executed by the processor, implement a first user plane entity (UPE) of a first UP path as described herein. Such instructions configure the first UPE for implementing a method of managing user plane path. Such a method includes receiving, by a first user plane entity (UPE) of a first UP path from a second UPE of a second UP path, a message indicating release of resources associated with a user equipment (UE), the message including one or more of: an identifier (ID) of a PDU session associated with the UE and ID of a third UPE of the second UP path. Such a method further includes sending, by the first UPE to a fourth UPE of the first UP path, a UP message for triggering the fourth UPE to forward traffic directed toward the first UPE to the third UPE, the UP message comprising the ID of the third UPE.

It is noted that in some cases the message described could be received from a connectivity manager, instead of the second UPE. Accordingly, another aspect provides instructions for implementing a UPE configured for implementing method of managing user plane path, the method including receiving, by a first user plane entity (UPE) of a first UP path from a connectivity manager, a message indicating release of resources associated with a user equipment (UE), the message including one or more of: an identifier (ID) of a PDU session associated with the UE and ID of a third UPE of a second UP path. Such a method further includes sending, by the first UPE to a fourth UPE of the first UP path, a UP message for triggering the fourth UPE to forward traffic directed toward the first UPE to the third UPE, the UP message comprising the ID of the third UPE.

As a further example an aspect of the invention provides a network node including a processor, and non-transitory machine readable memory storing machine executable instructions, which when executed by the processor, implement a first user plane entity (UPE) of a first UP path as described herein. Such instructions configure the first UPE for implementing a method of managing user plane path. a method of routing, by a user plane entity (UPE). Such a method includes receiving a data packet using a shared user plane (UP) tunnel, the data packet included in a tunneled data packet; selecting a user plane connection based traffic differentiation information (TDI) included in the tunnel header, the TDI differentiating the data packet from other traffic using the shared UP tunnel. Such a method further includes routing the data packet according to the user plane connection.

Another aspect of the invention provides a system for managing user plane path. Such a system includes various control plane and user plane entities as described herein. Each such entity can be instantiated in one or more network nodes, as described herein. As but one example such a system can comprise a plurality of user plane entities for carrying out the methods as described herein. As another example, such a system can include a plurality of user plane entities, in cooperation with one or more control plane entities for carrying out the methods as described herein.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A method of routing, by a user plane entity (UPE), the method comprising:
   receiving an initial data packet using a shared user plane (UP) tunnel, the initial data packet included in a tunneled data packet; and
   selecting a user plane connection based on traffic differentiation information (TDI) included in a tunnel header of the tunneled data packet, the TDI differentiating the initial data packet from other traffic using the shared UP tunnel, the TDI comprising one or more of:
   an identifier (ID) of a PDU session associated with the initial data packet,
   destination information indicating a destination of the initial data packet, and an ID of a UP path indicating the UP path over which the initial data packet is being routed; and
   routing the initial data packet according to the user plane connection.

2. The method of claim 1, wherein the UPE is a radio access network (RAN) node, and the user plane connection is one of: a data radio bearer and an N3 connection tunnel.

3. The method of claim 1, wherein the routing the initial data packet according to the user plane connection comprises producing an outbound tunnel packet having a tunnel header and a payload, the tunnel header including a corresponding TDI and the payload including the initial data packet.

4. The method of claim 1, wherein the tunnel header includes an indicator indicating whether traffic differentiation is needed.

5. The method of claim 1, wherein the tunneled data packet is a Generic Packet Radio Service Tunneling Protocol (GTP) packet.

6. The method of claim 1 further comprising:
receiving, by the UPE from a network function, packet handling rules for selecting the user plane connection.

7. The method of claim 6, wherein the TDI is a first TDI, the UPE is a radio access network (RAN) node, the packet handling rules comprise one or more of: tunnel endpoint identifiers (TEID), a second TDI, and quality of service (QoS) flow information.

8. The method of claim 7, wherein the initial data packet is a downlink (DL) data packet, the method further comprising:
allocating one or more data radio bearers (DRB) based on the packet handling rules; and
wherein the selecting a user plane connection based on a tunnel header of the tunneled data packet comprises selecting a DRB from the one or more DRB based on the packet handling rules and the tunnel header.

9. The method of claim 6, wherein:
the TDI is a first TDI;
the UPE is a user plane function (UPF), the packet handling rules comprise one of:
a second TDI for detecting traffic; and
the second TDI and a traffic differentiation indicator indicating whether to include the second TDI when routing a data packet;
the packet handling rules are sent as part of a packet detection rule (PDR) and a forwarding action rule (FAR), wherein the PDR comprises the second TDI, and the FAR comprises the traffic differentiation indicator when the packet handling rules include the traffic differentiation indicator;
the packet handling rules further comprise one or more of a packet filter and a packet flow description; and
the selecting a user plane connection based on a tunnel header of the tunneled data packet comprises: selecting the user plane connection based on the first TDI and the packet handling rules.

10. An apparatus comprising a processor and a memory having stored thereon machine readable instructions, the machine readable instructions, when executed by the processor configure a user plane entity (UPE) for:
receiving an initial data packet using a shared user plane (UP) tunnel, the initial data packet included in a tunneled data packet; and
selecting a user plane connection based on traffic differentiation information (TDI) included in a tunnel header of the tunneled data packet, the TDI differentiating the initial data packet from other traffic using the shared UP tunnel, the TDI comprising one or more of:
an identifier (ID) of a PDU session associated with the initial data packet, destination information indicating a destination of the initial data packet, and an ID of a UP path indicating the UP path over which the initial data packet is being routed; and
routing the initial data packet according to the user plane connection.

11. The apparatus of claim 10, wherein the UPE is a radio access network (RAN) node, and the user plane connection is one of: a data radio bearer and an N3 connection tunnel.

12. The apparatus of claim 10, wherein the routing the initial data packet according to the user plane connection comprises producing an outbound tunnel packet having a tunnel header and a payload, the tunnel header including a corresponding TDI and the payload including the initial data packet.

13. The apparatus of claim 10, wherein the tunnel header includes an indicator indicating whether traffic differentiation is needed.

14. The apparatus of claim 10, wherein the tunneled data packet is a Generic Packet Radio Service Tunneling Protocol (GTP) packet.

15. The apparatus of claim 10, wherein the processor further configured the UPE for:
receiving, by the UPE from a network function, packet handling rules for selecting the user plane connection.

16. The apparatus of claim 15, wherein the TDI is a first TDI, the UPE is a radio access network (RAN) node, the packet handling rules comprise one or more of: tunnel endpoint identifiers (TEID), a second TDI, and quality of service (QoS) flow information.

17. The apparatus of claim 16, wherein the initial data packet is a downlink (DL) data packet, wherein when the machine readable instructions are executed by the processor, the machine readable instructions further configure the UPE for:
allocating one or more data radio bearers (ORB) based on the packet handling rules; and
wherein the selecting a user plane connection based on the tunnel header of the tunneled data packet comprises selecting a DRB from the one or more DRB based on the packet handling rules and the tunnel header.

18. The apparatus of claim 15, wherein:
the TDI is a first TDI;
the UPE is a user plane function (UPF), the packet handling rules comprise one of:
a second TDI for detecting traffic; and
the second TDI and a traffic differentiation indicator indicating whether to include the second TDI when routing a data packet;
the packet handling rules are sent as part of packet detection rule (PDR) and a forwarding action rule (FAR), wherein the PDR comprises the second TDI, and the FAR comprises the traffic differentiation indicator when the packet handling rules include the traffic differentiation indicator;
the packet handling rules further comprise one or more of a packet filter and packet flow description; and
the selecting a user plane connection based on a tunnel header of the tunneled data packet comprises: selecting the user plane connection based on the first TDI and the packet handling rules.

* * * * *

UNITED STATES PATENT AND TRADEMARK OFFICE
CERTIFICATE OF CORRECTION

Page 1 of 1

PATENT NO. : 11,871,273 B2
APPLICATION NO. : 17/090678
DATED : January 9, 2024
INVENTOR(S) : Xu Li, Hang Zhang and Bidi Ying It is certified that error appears in the above-identified patent and that said Letters Patent is hereby corrected as shown below:

In the Claims

Column 38, Line 35, "allocating one or more data radio bearers (ORB) based on" should read --allocating one or more data radio bearers (DRB) based on--.

Signed and Sealed this
Twenty-seventh Day of August, 2024

Katherine Kelly Vidal
*Director of the United States Patent and Trademark Office*